United States Patent
Kim et al.

(10) Patent No.: US 12,235,889 B2
(45) Date of Patent: Feb. 25, 2025

(54) DEVICE MESSAGES PROVIDED IN DISPLAYED IMAGE COMPILATIONS BASED ON USER CONTENT

(71) Applicant: Google LLC, Mountain View, CA (US)

(72) Inventors: Dae Woong Daniel Kim, Sunnyvale, CA (US); Nivetha Govindaraju, New York City, NY (US); Kyungmin Lee, San Mateo, CA (US); Haoran Man, Cupertino, CA (US); Nicholas Tsoi-A-Sue, San Francisco, CA (US); Wei Zheng, Mountain View, CA (US); James Colin Aspinall, South Lake Tahoe, CA (US); Guillermo Krovblit, Mountain View, CA (US); Daniel Robert Jenstad, Breckenridge, CO (US)

(73) Assignee: Google LLC, Mountain View, CA (US)

( * ) Notice: Subject to any disclaimer, the term of this patent is extended or adjusted under 35 U.S.C. 154(b) by 379 days.

(21) Appl. No.: 17/896,932

(22) Filed: Aug. 26, 2022

(65) Prior Publication Data
US 2024/0070189 A1 Feb. 29, 2024

(51) Int. Cl.
*G06F 16/51* (2019.01)
*G06V 10/40* (2022.01)

(52) U.S. Cl.
CPC .............. *G06F 16/51* (2019.01); *G06V 10/40* (2022.01)

(58) Field of Classification Search
CPC ......... G06F 16/51; G06F 16/54; G06V 10/40; G11B 27/102; G11B 27/34
See application file for complete search history.

(56) References Cited

U.S. PATENT DOCUMENTS

| 5,963,649 A | 10/1999 | Sako |
| 6,092,102 A | 7/2000 | Wagner |

(Continued)

FOREIGN PATENT DOCUMENTS

| CA | 2828011 | 9/2012 |
| CN | 1475908 | 2/2004 |

(Continued)

OTHER PUBLICATIONS

International Search Report and Written Opinion for International Patent Application No. PCT/US2015/014414, May 11, 2015, 8 pages.

(Continued)

*Primary Examiner* — Chan S Park
*Assistant Examiner* — Daniel C Chang
(74) *Attorney, Agent, or Firm* — IP Spring

(57) ABSTRACT

Implementations described herein relate to providing device messages in image compilations based on user content. A computer-implemented method includes determining that a playback mode is entered on a device to display one or more image compilations, each image compilation including images for successive display. Message criteria are obtained for device messages, each device message indicating a device function associated with images of the image compilations or of a user image library. A device message is selected based on associated message criteria. An image is identified in the user image library, the image being in the image compilations, depicts a type of image feature in the image compilations, and/or has characteristic(s) modifiable by the device function. The device message is displayed during image compilation playback and includes the identified image and a message control option. In response to user selection of the message control option, the device function is initiated.

11 Claims, 6 Drawing Sheets

(56) References Cited

U.S. PATENT DOCUMENTS

| | | |
|---|---|---|
| 6,883,140 B1 | 4/2005 | Acker et al. |
| 7,603,413 B1 | 10/2009 | Herold et al. |
| 7,904,187 B2 | 3/2011 | Hoffberg et al. |
| 8,266,109 B1 | 9/2012 | Bilsborough |
| 8,391,618 B1 | 3/2013 | Chuang et al. |
| 8,423,577 B1 | 4/2013 | Lee et al. |
| 8,515,958 B2 | 8/2013 | Knight |
| 8,554,701 B1 | 10/2013 | Dillard et al. |
| 8,589,407 B2 | 11/2013 | Bhatia |
| 8,645,697 B1 | 2/2014 | Emigh et al. |
| 8,650,210 B1 | 2/2014 | Cheng et al. |
| 8,688,698 B1 | 4/2014 | Black et al. |
| 8,700,480 B1 | 4/2014 | Fox |
| 8,825,474 B1 | 9/2014 | Zhai et al. |
| 8,938,669 B1 | 1/2015 | Cohen |
| 8,996,639 B1 | 3/2015 | Faaborg et al. |
| 9,019,415 B2 | 4/2015 | Ma et al. |
| 9,020,956 B1 | 4/2015 | Barr et al. |
| 9,043,407 B1 | 5/2015 | Gaulke et al. |
| 9,191,786 B2 | 11/2015 | Davis |
| 9,213,941 B2 | 12/2015 | Petersen |
| 9,230,241 B1 | 1/2016 | Singh et al. |
| 9,262,517 B2 | 2/2016 | Feng et al. |
| 9,330,110 B2 | 5/2016 | Lin et al. |
| 9,467,435 B1 | 10/2016 | Tyler |
| 9,560,152 B1 | 1/2017 | Jamdar et al. |
| 9,595,059 B2 | 3/2017 | Knudson et al. |
| 9,600,724 B2 | 3/2017 | Ko et al. |
| 9,633,048 B1 | 4/2017 | Dutta et al. |
| 9,674,120 B2 | 6/2017 | Davis |
| 9,715,496 B1 | 7/2017 | Sapoznik et al. |
| 9,727,584 B2 | 8/2017 | Alldrin et al. |
| 9,805,371 B1 | 10/2017 | Sapoznik et al. |
| 9,807,037 B1 | 10/2017 | Sapoznik et al. |
| 9,817,813 B2 | 11/2017 | Faizakof et al. |
| 9,973,705 B2 | 5/2018 | Kinugawa et al. |
| 10,127,945 B2 | 11/2018 | Ho |
| 10,129,193 B2 | 11/2018 | Mahmoud et al. |
| 10,146,748 B1 | 12/2018 | Barndollar et al. |
| 10,146,768 B2 | 12/2018 | Fuxman et al. |
| 10,404,636 B2 | 9/2019 | Rodriguez et al. |
| 10,412,030 B2 | 9/2019 | McGregor et al. |
| 10,440,279 B2 | 10/2019 | Ko et al. |
| 10,547,574 B2 | 1/2020 | Pham |
| 10,642,893 B2 | 5/2020 | Novikoff et al. |
| 10,979,373 B2 | 4/2021 | Pham |
| 11,321,385 B2 | 5/2022 | Ho et al. |
| 11,328,013 B2 | 5/2022 | Novikoff et al. |
| 2002/0040297 A1 | 4/2002 | Tsiao et al. |
| 2002/0103837 A1 | 8/2002 | Balchandran et al. |
| 2003/0105589 A1 | 6/2003 | Liu et al. |
| 2003/0182374 A1 | 9/2003 | Haldar |
| 2005/0146621 A1 | 7/2005 | Tanaka et al. |
| 2006/0004685 A1 | 1/2006 | Pyhalammi et al. |
| 2006/0021023 A1 | 1/2006 | Stewart et al. |
| 2006/0029106 A1 | 2/2006 | Ott et al. |
| 2006/0150119 A1 | 7/2006 | Chesnais et al. |
| 2006/0156209 A1 | 7/2006 | Matsuura et al. |
| 2006/0172749 A1 | 8/2006 | Sweeney |
| 2007/0030364 A1 | 2/2007 | Obrador et al. |
| 2007/0094217 A1 | 4/2007 | Ronnewinkel |
| 2007/0162942 A1 | 7/2007 | Hamynen et al. |
| 2007/0244980 A1 | 10/2007 | Baker et al. |
| 2008/0120371 A1 | 5/2008 | Gopal |
| 2008/0153526 A1 | 6/2008 | Othmer |
| 2008/0189367 A1 | 8/2008 | Okumura |
| 2009/0007019 A1 | 1/2009 | Kobayashi et al. |
| 2009/0076795 A1 | 3/2009 | Bangalore et al. |
| 2009/0119584 A1 | 5/2009 | Herbst |
| 2009/0282114 A1 | 11/2009 | Feng et al. |
| 2009/0313194 A1 | 12/2009 | Amar et al. |
| 2009/0327436 A1 | 12/2009 | Chen |
| 2010/0077029 A1 | 3/2010 | Shook et al. |
| 2010/0118115 A1 | 5/2010 | Takahashi et al. |
| 2010/0228590 A1 | 9/2010 | Muller et al. |
| 2010/0251158 A1 | 9/2010 | Geppert et al. |
| 2010/0260426 A1 | 10/2010 | Huang et al. |
| 2011/0074685 A1 | 3/2011 | Causey et al. |
| 2011/0091092 A1 | 4/2011 | Nepomniachtchi et al. |
| 2011/0098056 A1 | 4/2011 | Rhoads |
| 2011/0107223 A1 | 5/2011 | Tilton et al. |
| 2011/0145068 A1 | 6/2011 | King et al. |
| 2011/0164163 A1 | 7/2011 | Bilbrey et al. |
| 2011/0202836 A1 | 8/2011 | Badger et al. |
| 2011/0212717 A1 | 9/2011 | Rhoads et al. |
| 2011/0221912 A1 | 9/2011 | Yoshizawa |
| 2011/0230174 A1 | 9/2011 | Mandanapu et al. |
| 2011/0252108 A1 | 10/2011 | Morris et al. |
| 2011/0252207 A1 | 10/2011 | Janosik, Jr. et al. |
| 2012/0030289 A1 | 2/2012 | Buford et al. |
| 2012/0033876 A1 | 2/2012 | Momeyer et al. |
| 2012/0041941 A1 | 2/2012 | King et al. |
| 2012/0041973 A1 | 2/2012 | Kim et al. |
| 2012/0042036 A1 | 2/2012 | Lau et al. |
| 2012/0089847 A1 | 4/2012 | Tu et al. |
| 2012/0096097 A1 | 4/2012 | Morinaga et al. |
| 2012/0131520 A1 | 5/2012 | Tang et al. |
| 2012/0140124 A1 | 6/2012 | Moroney et al. |
| 2012/0179717 A1 | 7/2012 | Kennedy et al. |
| 2012/0224743 A1 | 9/2012 | Rodriguez et al. |
| 2012/0239761 A1 | 9/2012 | Linner et al. |
| 2012/0245944 A1 | 9/2012 | Gruber et al. |
| 2012/0278164 A1 | 11/2012 | Spivack et al. |
| 2012/0322428 A1 | 12/2012 | Lupoli et al. |
| 2013/0021266 A1 | 1/2013 | Selim |
| 2013/0022231 A1 | 1/2013 | Nepomniachtchi et al. |
| 2013/0036162 A1 | 2/2013 | Koenigs |
| 2013/0050507 A1 | 2/2013 | Syed et al. |
| 2013/0061148 A1 | 3/2013 | Das et al. |
| 2013/0073366 A1 | 3/2013 | Heath |
| 2013/0218877 A1 | 8/2013 | Satyanarayanan |
| 2013/0260727 A1 | 10/2013 | Knudson et al. |
| 2013/0262574 A1 | 10/2013 | Cohen |
| 2013/0346235 A1 | 12/2013 | Lam |
| 2014/0004889 A1 | 1/2014 | Davis |
| 2014/0012927 A1 | 1/2014 | Gertzfield et al. |
| 2014/0035846 A1 | 2/2014 | Lee et al. |
| 2014/0047413 A1 | 2/2014 | Sheive et al. |
| 2014/0067371 A1 | 3/2014 | Liensberger |
| 2014/0071324 A1 | 3/2014 | Tokunaga et al. |
| 2014/0088954 A1 | 3/2014 | Shirzadi et al. |
| 2014/0108562 A1 | 4/2014 | Panzer |
| 2014/0129942 A1 | 5/2014 | Rathod |
| 2014/0150068 A1 | 5/2014 | Janzer |
| 2014/0156801 A1 | 6/2014 | Fernandes et al. |
| 2014/0163954 A1 | 6/2014 | Joshi et al. |
| 2014/0164506 A1 | 6/2014 | Tesch et al. |
| 2014/0171133 A1 | 6/2014 | Stuttle et al. |
| 2014/0189027 A1 | 7/2014 | Zhang et al. |
| 2014/0189538 A1 | 7/2014 | Martens et al. |
| 2014/0195621 A1 | 7/2014 | Rao Dv |
| 2014/0201675 A1 | 7/2014 | Joo et al. |
| 2014/0228009 A1 | 8/2014 | Chen et al. |
| 2014/0232889 A1 | 8/2014 | King et al. |
| 2014/0237057 A1 | 8/2014 | Khodorenko |
| 2014/0298364 A1 | 10/2014 | Stepanov et al. |
| 2014/0317030 A1 | 10/2014 | Shen et al. |
| 2014/0337438 A1 | 11/2014 | Govande et al. |
| 2014/0341476 A1 | 11/2014 | Kulick et al. |
| 2014/0344058 A1 | 11/2014 | Brown |
| 2014/0372349 A1 | 12/2014 | Driscoll |
| 2014/0372540 A1 | 12/2014 | Libin |
| 2015/0006143 A1 | 1/2015 | Skiba et al. |
| 2015/0026101 A1 | 1/2015 | Lin et al. |
| 2015/0026642 A1 | 1/2015 | Wilson et al. |
| 2015/0032724 A1 | 1/2015 | Thirugnanasundaram et al. |
| 2015/0058720 A1 | 2/2015 | Smadja et al. |
| 2015/0088998 A1 | 3/2015 | Isensee et al. |
| 2015/0095855 A1 | 4/2015 | Bai et al. |
| 2015/0100537 A1 | 4/2015 | Grieves et al. |
| 2015/0127453 A1 | 5/2015 | Tew et al. |
| 2015/0171133 A1 | 6/2015 | Kim et al. |
| 2015/0178371 A1 | 6/2015 | Seth et al. |
| 2015/0178388 A1 | 6/2015 | Winnemoeller et al. |

(56) References Cited

U.S. PATENT DOCUMENTS

| | | |
|---|---|---|
| 2015/0185995 A1 | 7/2015 | Showmaker et al. |
| 2015/0207765 A1 | 7/2015 | Brantingham et al. |
| 2015/0220806 A1 | 8/2015 | Heller et al. |
| 2015/0222617 A1 | 8/2015 | Ebersman et al. |
| 2015/0227797 A1 | 8/2015 | Ko et al. |
| 2015/0244653 A1 | 8/2015 | Niu et al. |
| 2015/0248411 A1 | 9/2015 | Krinker et al. |
| 2015/0250936 A1 | 9/2015 | Thomas et al. |
| 2015/0286371 A1 | 10/2015 | Degani |
| 2015/0288633 A1 | 10/2015 | Ogundokun et al. |
| 2015/0302301 A1 | 10/2015 | Petersen |
| 2015/0347617 A1 | 12/2015 | Weinig et al. |
| 2015/0350117 A1 | 12/2015 | Bastide et al. |
| 2015/0370830 A1 | 12/2015 | Murphy-Chutorian et al. |
| 2016/0011725 A1 | 1/2016 | D'Argenio et al. |
| 2016/0037311 A1 | 2/2016 | Cho |
| 2016/0042252 A1 | 2/2016 | Sawhney et al. |
| 2016/0043817 A1 | 2/2016 | Handoush et al. |
| 2016/0043974 A1 | 2/2016 | Purcell et al. |
| 2016/0055246 A1 | 2/2016 | Marcin et al. |
| 2016/0065519 A1 | 3/2016 | Waltermann et al. |
| 2016/0072737 A1 | 3/2016 | Forster |
| 2016/0092044 A1 | 3/2016 | Laska et al. |
| 2016/0140447 A1 | 5/2016 | Cohen et al. |
| 2016/0140477 A1 | 5/2016 | Karanam et al. |
| 2016/0162791 A1 | 6/2016 | Petersen |
| 2016/0179816 A1 | 6/2016 | Glover |
| 2016/0196040 A1 | 7/2016 | Kapadia et al. |
| 2016/0210279 A1 | 7/2016 | Kim et al. |
| 2016/0210962 A1 | 7/2016 | Kim et al. |
| 2016/0224524 A1 | 8/2016 | Kay et al. |
| 2016/0226804 A1 | 8/2016 | Hampson et al. |
| 2016/0234553 A1 | 8/2016 | Hampson et al. |
| 2016/0283454 A1 | 9/2016 | Leydon et al. |
| 2016/0284011 A1 | 9/2016 | Dong et al. |
| 2016/0292217 A1 | 10/2016 | Sinha et al. |
| 2016/0308794 A1 | 10/2016 | Kim et al. |
| 2016/0321052 A1 | 11/2016 | Sharifi et al. |
| 2016/0342895 A1 | 11/2016 | Gao et al. |
| 2016/0350304 A1 | 12/2016 | Aggarwal et al. |
| 2016/0352656 A1 | 12/2016 | Galley et al. |
| 2016/0353168 A1* | 12/2016 | Allen ................. H04N 21/2743 |
| 2016/0378080 A1 | 12/2016 | Uppala et al. |
| 2017/0004383 A1 | 1/2017 | Lin et al. |
| 2017/0017648 A1 | 1/2017 | Pearlman et al. |
| 2017/0031575 A1 | 2/2017 | Dotan-Cohen et al. |
| 2017/0075878 A1 | 3/2017 | Jon et al. |
| 2017/0093769 A1 | 3/2017 | Lind et al. |
| 2017/0098122 A1 | 4/2017 | el Kaliouby et al. |
| 2017/0098152 A1 | 4/2017 | Kerr et al. |
| 2017/0118152 A1 | 4/2017 | Lee |
| 2017/0134316 A1 | 5/2017 | Cohen et al. |
| 2017/0142046 A1 | 5/2017 | Mahmoud et al. |
| 2017/0147202 A1 | 5/2017 | Hue |
| 2017/0149703 A1 | 5/2017 | Willett et al. |
| 2017/0153792 A1 | 6/2017 | Kapoor et al. |
| 2017/0171117 A1 | 6/2017 | Carr et al. |
| 2017/0180276 A1 | 6/2017 | Gershony et al. |
| 2017/0180294 A1 | 6/2017 | Milligan et al. |
| 2017/0185236 A1 | 6/2017 | Yang et al. |
| 2017/0187654 A1 | 6/2017 | Lee |
| 2017/0250930 A1 | 8/2017 | Ben-Itzhak |
| 2017/0250935 A1 | 8/2017 | Rosenberg |
| 2017/0250936 A1 | 8/2017 | Rosenberg et al. |
| 2017/0277701 A1 | 9/2017 | Maharajh et al. |
| 2017/0288942 A1 | 10/2017 | Plumb et al. |
| 2017/0293834 A1 | 10/2017 | Raison et al. |
| 2017/0308249 A1 | 10/2017 | Petterson et al. |
| 2017/0308589 A1 | 10/2017 | Liu et al. |
| 2017/0324868 A1 | 11/2017 | Tamblyn et al. |
| 2017/0339076 A1 | 11/2017 | Patil |
| 2017/0344224 A1 | 11/2017 | Kay et al. |
| 2017/0357432 A1 | 12/2017 | King et al. |
| 2017/0357442 A1 | 12/2017 | Peterson et al. |
| 2017/0359279 A1 | 12/2017 | Peterson et al. |
| 2017/0359281 A1 | 12/2017 | Yip et al. |
| 2017/0359282 A1 | 12/2017 | Alsina et al. |
| 2017/0359283 A1 | 12/2017 | Bernstein |
| 2017/0359285 A1 | 12/2017 | Weinig et al. |
| 2017/0359701 A1 | 12/2017 | Sarma et al. |
| 2017/0359702 A1 | 12/2017 | Peterson et al. |
| 2017/0359703 A1 | 12/2017 | Ciechanowski et al. |
| 2017/0366479 A1 | 12/2017 | Ladha et al. |
| 2018/0004397 A1 | 1/2018 | Mazzocchi |
| 2018/0005272 A1 | 1/2018 | Todasco et al. |
| 2018/0012231 A1 | 1/2018 | Sapoznik et al. |
| 2018/0013699 A1 | 1/2018 | Sapoznik et al. |
| 2018/0032499 A1 | 2/2018 | Hampson et al. |
| 2018/0032997 A1 | 2/2018 | Gordon et al. |
| 2018/0060705 A1 | 3/2018 | Mahmoud et al. |
| 2018/0083894 A1 | 3/2018 | Fung et al. |
| 2018/0083898 A1 | 3/2018 | Pham |
| 2018/0083901 A1 | 3/2018 | McGregor et al. |
| 2018/0088896 A1* | 3/2018 | Olson ..................... G06F 3/165 |
| 2018/0089230 A1 | 3/2018 | Qi |
| 2018/0090135 A1 | 3/2018 | Schlesinger et al. |
| 2018/0109526 A1 | 4/2018 | Fung et al. |
| 2018/0137097 A1 | 5/2018 | Lim et al. |
| 2018/0196854 A1 | 7/2018 | Burks |
| 2018/0210874 A1 | 7/2018 | Fuxman et al. |
| 2018/0227498 A1 | 8/2018 | Ko et al. |
| 2018/0293601 A1 | 10/2018 | Glazier |
| 2018/0295081 A1 | 10/2018 | McGregor et al. |
| 2018/0309706 A1 | 10/2018 | Kim et al. |
| 2018/0316637 A1 | 11/2018 | Desjardins |
| 2018/0322403 A1 | 11/2018 | Ron et al. |
| 2018/0336226 A1 | 11/2018 | Anorga et al. |
| 2018/0336415 A1 | 11/2018 | Anorga et al. |
| 2018/0352393 A1 | 12/2018 | Lottermoser et al. |
| 2018/0367483 A1 | 12/2018 | Rodriguez et al. |
| 2018/0367484 A1 | 12/2018 | Rodriguez et al. |
| 2018/0373683 A1 | 12/2018 | Hullette et al. |
| 2019/0204868 A1 | 7/2019 | Choi et al. |
| 2020/0106726 A1 | 4/2020 | Pham |
| 2021/0243143 A1 | 8/2021 | Pham |

FOREIGN PATENT DOCUMENTS

| | | |
|---|---|---|
| CN | 1988461 | 6/2007 |
| CN | 1989497 | 6/2007 |
| CN | 101159576 | 4/2008 |
| CN | 101983396 | 3/2011 |
| CN | 102158431 | 8/2011 |
| CN | 102222079 | 10/2011 |
| CN | 102395966 | 3/2012 |
| CN | 102467574 | 5/2012 |
| CN | 102667754 | 9/2012 |
| CN | 103226949 | 7/2013 |
| CN | 103493035 | 1/2014 |
| CN | 103548025 | 1/2014 |
| CN | 103841007 | 6/2014 |
| CN | 103995872 | 8/2014 |
| CN | 104035947 | 9/2014 |
| CN | 104202718 | 12/2014 |
| CN | 104836720 | 8/2015 |
| CN | 104951428 | 9/2015 |
| CN | 105262675 | 1/2016 |
| CN | 105683874 | 6/2016 |
| CN | 105786455 | 7/2016 |
| CN | 105814519 | 7/2016 |
| CN | 105898627 | 8/2016 |
| CN | 105940397 | 9/2016 |
| EP | 1376392 | 1/2004 |
| EP | 1394713 | 3/2004 |
| EP | 2523436 | 11/2012 |
| EP | 2560104 | 2/2013 |
| EP | 2688014 | 1/2014 |
| EP | 2703980 | 3/2014 |
| EP | 2852105 | 3/2015 |
| EP | 3091445 | 11/2016 |
| IN | 201621015181 | 5/2016 |
| JP | 2000-298676 | 10/2000 |
| JP | 2002-132804 | 5/2002 |
| JP | 2010-44495 | 2/2010 |

(56) References Cited

FOREIGN PATENT DOCUMENTS

| | | |
|---|---|---|
| JP | 2012-027950 | 2/2012 |
| JP | 2012-221480 | 11/2012 |
| JP | 2014-86088 | 5/2014 |
| JP | 2014-142919 | 8/2014 |
| JP | 2014-170397 | 9/2014 |
| JP | 2015-531136 | 10/2015 |
| KR | 20110003462 | 1/2011 |
| KR | 20130008036 | 1/2013 |
| KR | 10-2013-0050871 | 5/2013 |
| KR | 20130061387 | 6/2013 |
| KR | 20140093949 | 7/2014 |
| KR | 1020150037935 | 4/2015 |
| KR | 10-2015-0108096 | 9/2015 |
| KR | 10-2017-0032883 | 3/2017 |
| WO | 2004/104758 | 12/2004 |
| WO | 2008/045811 | 4/2008 |
| WO | 2011/002989 | 1/2011 |
| WO | 2012/173681 | 12/2012 |
| WO | WO 2015/183493 | 12/2015 |
| WO | 2016/072117 | 5/2016 |
| WO | 2016/130788 | 8/2016 |
| WO | 2016/204428 | 12/2016 |
| WO | 2018089109 | 5/2018 |

OTHER PUBLICATIONS

Chen, et al., "A Survey of Document Image Classification: problem statement, classifier architecture and performance evaluation", International Journal of Document Analysis and Recognition (IJDAR), vol. 10, No. 1, Aug. 3, 2006, pp. 1-16.
Chen, et al., "Bezel Copy: An Efficient Cross-0Application Copy-Paste Technique for Touchscreen Smartphones", Advanced Visual Interfaces, ACM, New York, New York, May 27, 2014, pp. 185-192.
EPO, International Search Report and Written Opinion for PCT Application No. PCT/US2017/046858, Oct. 11, 2017, 10 Pages.
EPO, Written Opinion of the International Preliminary Examining Authority for International Patent Application No. PCT/US2018/021028, Jun. 14, 2019, 11 pages.
EPO, International Search Report and Written Opinion for International Patent Application No. PCT/US2016/068083, Mar. 9, 2017, 13 pages.
WIPO, International Preliminary Report on Patentability for International Patent Application No. PCT/US2018/021028, Nov. 28, 2019, 10 pages.
WIPO, International Preliminary Report on Patentability for International Patent Application No. PCT/US2017/046858, Feb. 19, 2019, 7 pages.
PCT, International Search Report and Written Opinion for International Application No. PCT/US2018/021028, Jun. 15, 2018, 11 Pages.
USPTO, Final Office Action for U.S. Appl. No. 15/238,304, Nov. 23, 2018, 14 pages.
USPTO, Non-final Office Action for U.S. Appl. No. 15/709,418, Nov. 21, 2017, 15 pages.
USPTO, First Action Interview, Office Action Summary for U.S. Appl. No. 16/003,661, Dec. 14, 2018, 16 pages.
USPTO, Non-final Office Action for U.S. Appl. No. 16/560,815, May 18, 2020, 16 pages.
USPTO, Non-final Office Action for U.S. Appl. No. 15/238,304, Jun. 7, 2018, 17 pages.
USPTO, First Action Interview, Pre-Interview Communication for U.S. Appl. No. 15/709,440, May 16, 2019, 4 pages.
USPTO, First Action Interview, Pre-Interview Communication for U.S. Appl. No. 16/003,661, Aug. 29, 2018, 6 pages.
WIPO, International Preliminary Report on Patentability for International Patent Application No. PCT/US2017/52333, Dec. 4, 2018, 15 pages.
WIPO, Written Opinion of the International Preliminary Examining Authority for International Patent Application No. PCT/US2017/52333, Aug. 17, 2018, 5 pages.
WIPO, International Search Report and Written Opinion PCT application No. PCT/US2017/052333, Nov. 30, 2017, 15 pages.
Yeh, et al., "Searching the web with mobile images for location recognition", Proceedings of the 2004 IEEE Computer Society Conference on Pattern Recognition, vol. 2, Jun.-Jul. 2004, pp. 1-6.
Zhao, et al., "Cloud-based push-styled mobile botnets: a case study of exploiting the cloud to device messaging service", Proceedings ACSAC '12, Proceedings of the 28th Annual Computer Security Applications Conference, ACM Digital Library, Dec. 3, 2012, pp. 119-128.

\* cited by examiner

DEVICE MESSAGES PROVIDED IN DISPLAYED IMAGE COMPILATIONS BASED ON USER CONTENT

BACKGROUND

Users of devices such as smartphones or other digital cameras capture and store a large number of photos and videos in their image libraries. Users utilize such libraries to view their photos and videos to reminisce about various events such as birthdays, weddings, vacations, trips, etc. Some devices can present image-based creations based on a user's photos, such as image compilations that present selected images in a successive manner.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations described herein relate to methods, devices, and computer-readable media to generate and provide device messages in displayed image compilations. In some implementations, a computer-implemented method includes determining that a playback mode is entered on a device, the playback mode to display one or more image compilations on a display of the device, and where each image compilation includes images to be successively displayed on the display of the device. Message criteria are obtained for one or more device messages, each of the one or more device messages indicating a respective device function associated with respective one or more images of the one or more image compilations or of a user image library. In response to determining that the playback mode is entered, the device message is selected from a plurality of device messages based on the message criteria associated with the device message. An image is identified in the user image library associated with the user, the image to be included in the selected device message, wherein the image is included in at least one of the one or more image compilations, depicts one or more features having a same type as one or more image features depicted in at least one image included in the one or more image compilations, and/or has one or more characteristics modifiable by the device function indicated by the selected device message. The selected device message is caused to be displayed on the display of the device, the message including a message control option that is user-selectable and the identified image. In response to receiving user input that selects the message control option, the device function is initiated.

In some implementations, the message criteria for each device message includes one or more trigger conditions for the device message, and selecting the device message includes determining whether the one or more trigger conditions have been met; the one or more trigger conditions can include time-based conditions and/or content-based conditions. For example, time-based conditions can include: a minimum duration of the image compilations, and/or the image compilations are played in a particular time period (e.g., day). Content-based conditions can include a particular type of image feature visually depicted in the image compilations, including person's faces, animals, and/or landscape features.

In some implementations, display criteria are obtained and selecting the device message is based on the message criteria and the display criteria. The display criteria can include: displaying a maximum threshold number of device messages on the device in each particular period of time; displaying a minimum threshold number of images in image compilations prior to displaying each device message; and/or displaying a minimum threshold of other device messages before repeating display of a particular device message (or a particular type of device message).

In some implementations, the device function of the device message can include enabling a user to order physical prints of the one or more images; modifying one or more colors of the one or more images; storing the one or more images in particular storage that is in communication with the device; sharing the one or more images with one or more other devices; adding the one or more images to one or more other image compilations accessible by the device; and/or causing display of an input field to receive user input that confirms or provides a label for an image feature in an image of the image compilation, or confirms or provides a title for the image compilation.

In some implementations, the displayed device message can further include a skip option that is user-selectable, such that, in response to receiving user input that selects the skip option, the displayed device message is removed from the display and playback of the one or more image compilations is continued. In some implementations, in response to the skip option being selected, the message criteria for the displayed device message is modified to cause future display of the device message to be reduced in frequency. In some implementations, the message criteria include a cooldown period that prohibits the displayed device message from being displayed on the display in the playback mode for a time period at least equal to the cooldown period after previously being so displayed.

In some implementations, in response to receiving the user input that selects the message control option, a menu of a plurality of options is displayed, the plurality of options associated with the device function of the displayed device message. In some implementations, the displayed device message is associated with a particular time duration, and in response to expiration of the particular time duration, the device message is removed from the display and playback of the one or more image compilations continues. In some implementations, a schedule is determined that is associated with the selected device message, the schedule indicating when the device message is to be displayed during playback of a particular one of the one or more image compilations or between playback of two successive image compilations of the image compilations.

Some implementations may include a computing device that includes a processor and a memory coupled to the processor. The memory may have instructions stored thereon that, when executed by the processor, cause the processor to perform operations that include one or more of the features described above for the method.

Some implementations include a non-transitory computer-readable medium with instructions stored thereon that, when executed by a processor, cause the processor to perform operations that include can be similar to features described above for the method and computing device.

DETAILED DESCRIPTION

Figure 1:
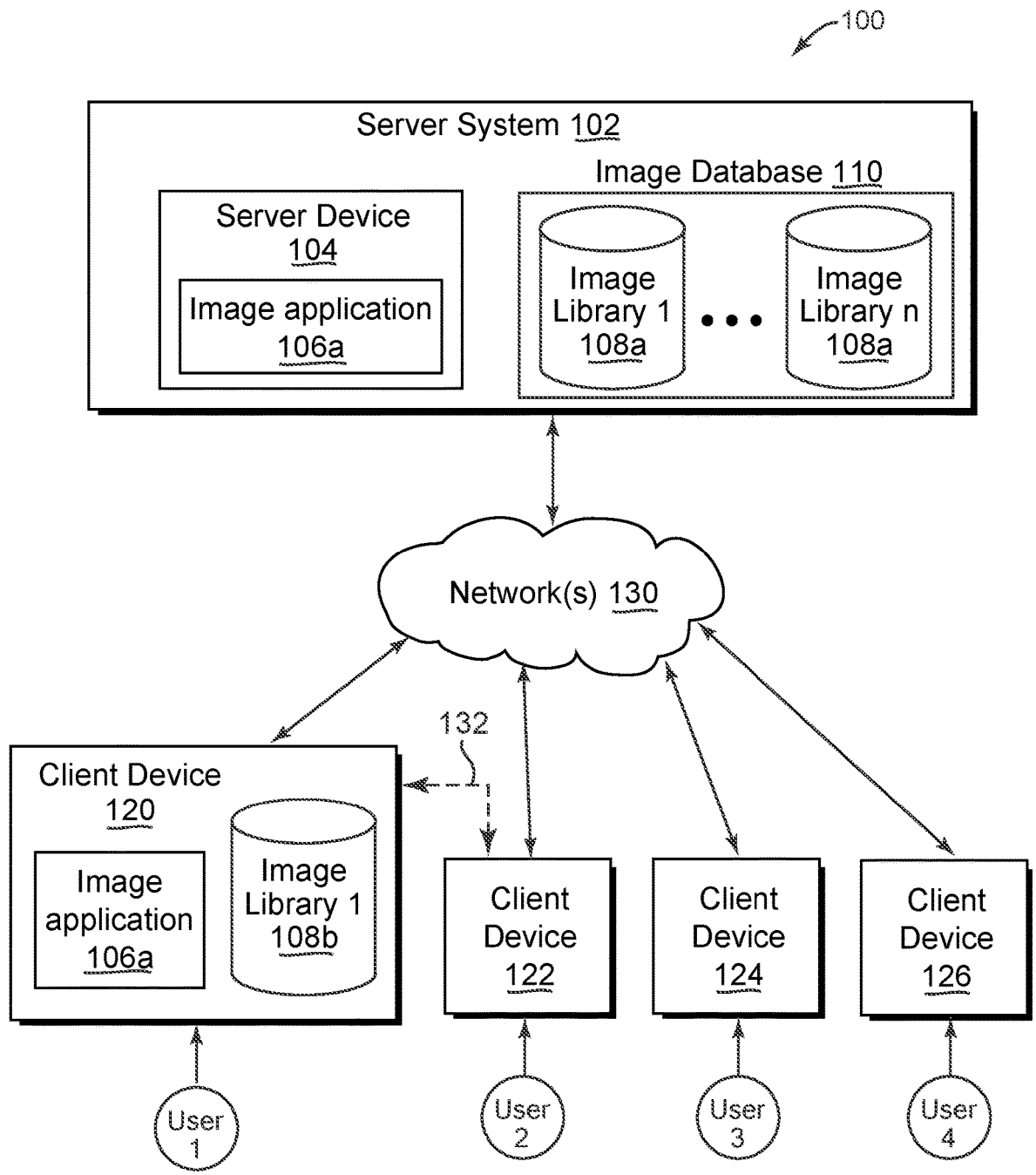
FIG. 1 is a block diagram of an example network environment which may be used for one or more implementations described herein.

This disclosure relates to automatically providing device messages during playback of image compilations, the device messages relating to device functions (e.g., functions of an image library application or other application that executes on the device). The device messages can include images associated with the user. A device plays image compilations that include images from the user's image library that are successively displayed, and device messages are provided during the playback of the image compilations. For example, device messages can provide or indicate device functions of the device that relate to images in played image compilations or images in the user's image library.

In some examples, when an image compilation playback mode is entered on a device, message criteria associated with device messages are evaluated. One or more device messages are selected based on the message criteria and scheduled for display during a playing image compilation. An image in the user's image library is also identified for inclusion in the selected device message. The identified image is included in at least one of the playing image compilations, depicts one or more image features having a same type as one or more image features depicted in at least one image in the image compilations, and/or includes one or more characteristics modifiable by the device function indicated by the selected device message. At a scheduled time, a selected device message is displayed on the display of the device, and the message includes a user-selectable message control option, the identified image, and a user-selectable skip option. If the message control option is selected, the device function indicated by the displayed device message is called and initiated. If the skip option is selected, the displayed device message is removed from the display.

Various device functions indicated and made actionable by the device message can include, for example, enabling a user to order physical prints of images, modifying one or more colors of images, storing images in particular storage that is in communication with the device, sharing images with other devices, adding images to one or more other image compilations accessible by the device, prompting the user to confirm information or input information associated with the image compilation or images, etc. The message criteria can include trigger conditions such as time-based conditions, content-based conditions, and/or device state-based conditions, which are evaluated to determine if the device message is eligible for display.

In some implementations, other display conditions can also be used, which may make a device message ineligible for display if, e.g., more than a threshold number of device messages are displayed per period of time (e.g., a device message cannot be displayed within a threshold time since a previous display of a device message on the device). Other display conditions can include ineligibility for display if less than a threshold number of images are displayed in an image compilation prior to the display of the device message, or if the same device message is repeatedly displayed too frequently. In some implementations, the message criteria include a cooldown period that prohibits the displayed device message from being displayed for the cooldown period after previously being displayed. If the user selects the skip option, the message criteria for the displayed device message can be modified to cause future display of the device message to be reduced in frequency, e.g., the cooldown period can be increased.

Described features advantageously indicate and provide device functions related to a displayed image compilation and/or images of a user via the presentation of device messages during display of the image compilation. Trigger conditions and other display conditions constrain the display of device messages to relevant times during playback of the image compilations, and also prevent the device messages from becoming too obtrusive to the user. Images from the image compilations and/or from user's own image library are presented in device messages, thus providing a clear and relevant context for the device functions indicated in the device messages.

Device or application functions are thus presented by the described device messages under conditions in which they are highly relevant to be initiated by a user. This is in contrast to prior systems in which the user does not know about particular device functions or has to remember to use a relevant device function at other times, e.g., after image compilation playback is over. Furthermore, in prior systems the user is often required to hunt for a particular device function among a large selection of applications and menu options provided by the device, thus using additional device resources such as processing resources and device power. The described presentation of device functions during image compilation playback thus can reduce consumption of such resources on a device, allowing devices to expend fewer computational resources to obtain results.

Further to the descriptions herein, a user may be provided with controls allowing the user to make an election as to both if and when systems, programs, or features described herein may enable collection of user information (e.g., information about a user's call history specifying entities and entity identifiers called, social network, social actions, or activities, profession, a user's preferences including for call menus, a user's current location, a user's messages, outgoing calls placed by a user, audio data of a call, or a user's device), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 illustrates a block diagram of an example network environment 100, which may be used in some implementations described herein. In some implementations, network environment 100 includes one or more server systems, e.g., server system 102 in the example of FIG. 1, and a plurality of client devices, e.g., client devices 120-126, each associated with a respective user of users U1-U4. Each of server system 102 and client devices 120-126 may be configured to communicate with a network 130.

Server system 102 can include a server device 104 and an image database 110. In some implementations, server device 104 may provide image application 106a. In FIG. 1 and the remaining figures, a letter after a reference number, e.g., "106a," represents a reference to the element having that particular reference number. A reference number in the text without a following letter, e.g., "106," represents a general reference to embodiments of the element bearing that reference number.

Image database 110 may be stored on a storage device that is part of server system 102. In some implementations, image database 110 may be implemented using a relational database, a key-value structure, or other type of database structure. In some implementations, image database 110 may include a plurality of partitions, each corresponding to a respective image library for each of users 1-4. For example, as seen in FIG. 1, image database 110 may include a first image library (image library 1, 108a) for user 1, and other image libraries (image library 2, . . . , image library n) for various other users. While FIG. 1 shows a single image database 110, it may be understood that image database 110 may be implemented as a distributed database, e.g., over a plurality of database servers. Further, while FIG. 1 shows a plurality of partitions, one for each user, in some implementations, each image library may be implemented as a separate database.

Image library 108a may store a plurality of images associated with user 1, metadata associated with the plurality of images, and one or more other database fields, stored in association with the plurality of images. Access permissions for image library 108a may be restricted such that user 1 can control how images and other data in image library 108a may be accessed, e.g., by image application 106, by other applications, and/or by one or more other users. Server system 102 may be configured to implement the access permissions, such that image data of a particular user is accessible only as permitted by the user.

An image as referred to herein can include a digital image having pixels with one or more pixel values (e.g., color values, brightness values, etc.). An image can be a still image (e.g., still photos, images with a single frame, etc.), a dynamic image (e.g., animations, animated GIFs, cinemographs where a portion of the image includes motion while other portions are static, etc.), or a video (e.g., a sequence of images or image frames that may optionally include audio). An image as used herein may be understood as any of the above. For example, implementations described herein can be used with still images (e.g., a photograph, or other image), videos, or dynamic images.

Network environment 100 can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication between devices, e.g., using peer-to-peer wireless protocols (e.g., Bluetooth®, Wi-Fi Direct, etc.), etc. One example of peer-to-peer communication between two client devices 120 and 122 is shown by arrow 132.

In various implementations, users 1, 2, 3, and 4 may communicate with server system 102 and/or each other using respective client devices 120, 122, 124, and 126. In some examples, users 1, 2, 3, and 4 may interact with each other via applications running on respective client devices and/or server system 102 and/or via a network service, e.g., a social network service or other type of network service, implemented on server system 102. For example, respective client devices 120, 122, 124, and 126 may communicate data to and from one or more server systems, e.g., server system 102.

In some implementations, the server system 102 may provide appropriate data to the client devices such that each client device can receive communicated content or shared content uploaded to the server system 102 and/or a network service. In some examples, users 1-4 can interact via image sharing, audio or video conferencing, audio, video, or text chat, or other communication modes or applications.

A network service implemented by server system 102 can include a system allowing users to perform a variety of communications, form links and associations, upload and post shared content such as images, text, audio, and other types of content, and/or perform other functions. For example, a client device can display received data such as content posts sent or streamed to the client device and originating from a different client device via a server and/or network service (or from the different client device directly), or originating from a server system and/or network service. In some implementations, client devices can communicate directly with each other, e.g., using peer-to-peer communications between client devices as described above. In some implementations, a "user" can include one or more programs or virtual entities, as well as persons that interface with the system or network.

In some implementations, any of client devices 120, 122, 124, and/or 126 can provide one or more applications. For example, as shown in FIG. 1, client device 120 may provide image application 106b. Client devices 122-126 may also provide similar applications. Image application 106a may be implemented using hardware and/or software of client device 120. In different implementations, image application 106a may be a standalone client application, e.g., executed on any of client devices 120-124, or may work in conjunction with image application 106b provided on server system 102.

Image application 106 may provide various features, implemented with user permission, that are related to images. For example, such features may include one or more of capturing images using a camera, modifying the images, determining image quality (e.g., based on factors such as face size, blurriness, number of faces, image composition, lighting, exposure, etc.), storing images or videos in an image library 108, providing user interfaces to view images or image-based creations, etc.

In some implementations, with user permission, the features provided by image application 106 may include analyzing images to determine image features depicted in the images (by the pixels of the images) (e.g., persons, objects, animals, landscape features, etc.) using one or more user-permitted techniques such as face/object detection, face/object recognition, gait recognition, pose recognition, etc.) and to generate one or more labels for each image feature depicted in images in image library 108. The labels for each image may be stored in association with the image in image library 108. In some implementations, generating the labels can further include obtaining a thumbnail representation of the image feature(s) depicted in the image, e.g., a close-up of a person or other object, obtained via zooming or cropping an image that depicts the object.

In some implementations, with user permission, image application 106 may analyze images to generate data and store such data in image library 108. For example, image application 106 can generate image compilations, and/or can provide functions to enable a user to generate image compilations. Herein, an "image compilation" refers to a collection of multiple images, where each "image" includes any of a still image, video, animation, collage, etc., and where the images are to be displayed in a successive or sequential manner (e.g., similarly to a slideshow). The images in a particular image compilation can have one or more common characteristics. For example, an image compilation may correspond to a particular event at which the images were captured, e.g., a birthday, wedding, or other celebration; trips or activities such as a ski vacation, a hiking trip, a beach vacation, a game or concert, a family picnic, etc. The images in an image compilation can be captured within a time period that is associated with the image compilation. For example, the images associated with a hiking vacation may include images taken during the time period while the user was on vacation. In further examples, images in a compilation can have image features related to each other, a threshold quality (e.g., sharpness, brightness, etc.), a threshold size and/or quality of image features, recency or similar times of capture of the images, image resolution, a similar duration (length) (if a video; e.g., within a threshold duration of each other), etc. Generating the image-based creation may include sequentially arranging the images in the slideshow, along with a respective display period for each image. For example, the images may be organized chronologically, based on the number of people depicted in each image, visual content of the image (e.g., smiling faces, pose, objects depicted in the image), geographic locations at which the images were captured, and/or other factors.

Image application 106 can generate an image compilation based on user input. For example, the image compilation can include images from the user's library (or other sources) that have been selected and/or ordered by the user. In some implementations, image application 106 can create image compilations automatically and without user input. For example, image application 106 may analyze images and associated characteristics (e.g., locations, timestamps, image feature content, etc., which can be included in image metadata in some implementations) to group and/or order the images into one or more image compilations. In some implementations, an image compilation may be associated with an event (e.g., a birthday or other celebration, a trip), a particular time period, a particular theme or subject, a type of depicted image feature, or other common characteristic of the images in the image compilation. Image application 106 may (iteratively) analyze images in image library 108 to determine the plurality of image compilations. Upon determining the image compilations, image application 106 may update image library 108 to indicate one or more image compilations that each image in the image library is associated with. Image compilations can be assigned titles by the user or automatically by the device or other system.

While the foregoing description refers to a variety of features of image application 106, it will be understood that in various implementations, image application 106 may provide fewer or more features. Further, each user is provided with options to enable and/or disable certain features. Features of image application 106 are implemented specifically with user permission.

Client device 120 may include an image library 108*b* of user 1, which may be a standalone image library. In some implementations, image library 108*b* may be usable in combination with image library 108*a* on server system 102. For example, with user permission, image library 108*a* and image library 108*b* may be synchronized via network 130. In some implementations, image library 108 may include a plurality of images associated with user 1, e.g., images captured by the user (e.g., using a camera of client device 120, or other device), images shared with the user 1 (e.g., from respective image libraries of other users 2-4), images downloaded by the user 1 (e.g., from websites, from messaging applications, etc.), screenshots, and other images.

In some implementations, image library 108*b* on client device 120 may include a subset of images in image library 108*a* on server system 102. For example, such implementations may be advantageous when a limited amount of storage space is available on client device 120.

In some implementations, image application 106 may enable a user to manage the image library. For example, a user may use a backup feature of image application 106*b* on a client device (e.g., any of client devices 120-126) to back up local images on the client device to a server device, e.g., server device 104. For example, the user may manually select one or more images to be backed up, or specify backup settings that identify images to be backed up. Backing up an image to a server device may include transmitting the image to the server for storage by the server, e.g., in coordination with image application 106*a* on server device 104.

In different implementations, client device 120 and/or server system 102 may include other applications (not shown) that may be applications that provide various types of functionality, e.g., calendar, address book, e-mail, web browser, shopping, transportation (e.g., taxi, train, airline reservations, etc.), entertainment (e.g., a music player, a video player, a gaming application, etc.), social networking (e.g., messaging or chat, audio/video calling, sharing images/video, etc.) and so on. In some implementations, one or more of the other applications may be standalone applications that execute on client device 120. In some implementations, one or more of the other applications may access a server system, e.g., server system 102, that provides data and/or functionality of the other applications.

A user interface on a client device 120, 122, 124, and/or 126 can enable the display of user content and other content, including images, video complications (and other image-based creations), data, and other content as well as communications, privacy settings, notifications, and other data. Such a user interface can be displayed using software on the client device, software on the server device, and/or a combination of client software and server software executing on server device 104, e.g., application software or client software in communication with server system 102. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

For ease of illustration, FIG. 1 shows one block for server system 102, server device 104, image database 110, and shows four blocks for client devices 120, 122, 124, and 126. Server blocks 102, 104, and 110 may represent multiple systems, server devices, and network databases, and the blocks can be provided in different configurations than shown. For example, server system 102 can represent multiple server systems that can communicate with other server systems via the network 130. In some implementations, server system 102 can include cloud hosting servers, for example. In some examples, image database 110 may be stored on storage devices provided in server system block(s) that are separate from server device 104 and can communicate with server device 104 and other server systems via network 130.

Also, there may be any number of client devices. Each client device can be any type of electronic device, e.g., desktop computer, laptop computer, portable or mobile device, cell phone, smartphone, tablet computer, television, TV set top box or entertainment device, wearable devices (e.g., display glasses or goggles, wristwatch, headset, armband, jewelry, etc.), personal digital assistant (PDA), media player, game device, etc. In some implementations, network environment 100 may not have all of the components shown and/or may have other elements including other types of elements instead of, or in addition to, those described herein.

Other implementations of features described herein can use any type of system and/or service. For example, other networked services (e.g., connected to the Internet) can be used instead of or in addition to a social networking service. Any type of electronic device can make use of features described herein. Some implementations can provide one or more features described herein on one or more client or server devices disconnected from or intermittently connected to computer networks. In some examples, a client device including or connected to a display device can display content posts stored on storage devices local to the client device, e.g., received previously over communication networks.

Figure 2:
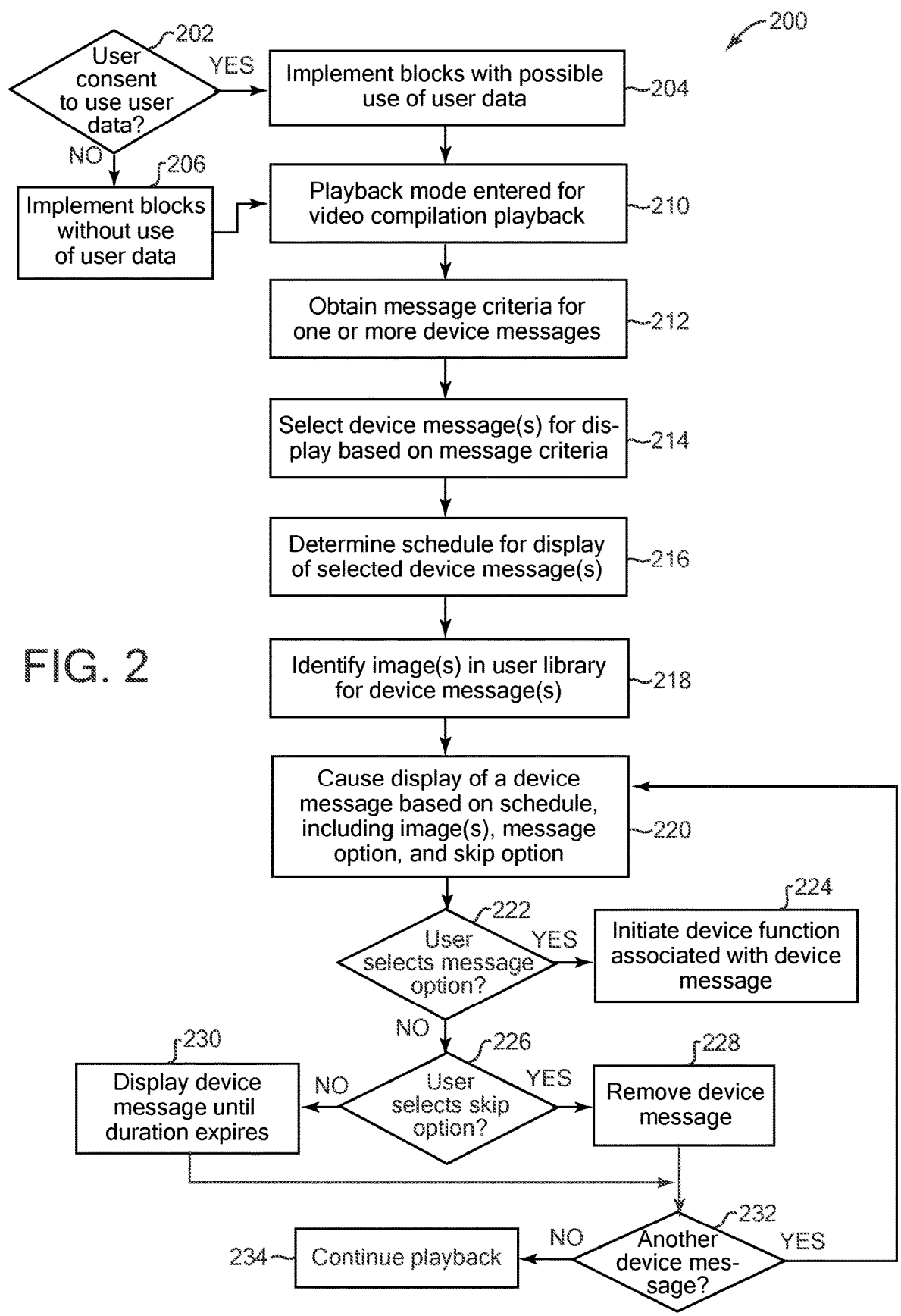
FIG. 2 is a flow diagram illustrating an example method to provide a user interface that provides device messages in image-based image compilations, according to some implementations.

FIG. 2 is a flow diagram illustrating an example method 200 to provide a user interface that provides device messages in image-based image compilations. In some implementations, method 200 can be implemented, for example, on a server system 102 as shown in FIG. 1. In some implementations, some or all of the method 200 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database or other storage). In some implementations, different components of one or more servers and/or clients can perform different blocks or other parts of the method 200. In some examples, a first device is described as performing blocks of method 200. Some implementations can have one or more blocks of method 200 performed by one or more other devices (e.g., other client devices or server devices) that can send results or data to the first device.

In some implementations, the method 200, or portions of the method, can be initiated automatically by a system. For example, the method (or portions thereof) can be performed periodically, e.g., every few hours, daily, weekly, or at other suitable intervals. In some implementations, the method (or portions therefore) can be performed based on one or more particular events or conditions, e.g., selection of an image compilation by a user, a client device launching image application 106 capture of new images by a client device, upload of new images to a server system 102, a predetermined time period having expired since the last performance of method 200, and/or one or more other conditions occurring which can be specified in settings read by the method.

Method 200 may begin at block 202. In block 202, user permission is obtained to use user data in the implementation of method 200. For example, user data for which permission is obtained can include images stored on a client device (e.g., any of client devices 120-126) and/or a server device, image metadata, user data related to the use of an image management application, user responses to image compilations, device messages, other image-based creations, etc. The user is provided with options to selectively provide permission to access such user data. For example, a user may choose to provide permission to access all of the requested user data, any subset of the requested data, or none of the requested data. One or more blocks of the methods described herein may use such user data in some implementations. Block 202 is followed by block 204.

In block 204, it is determined whether the remainder of method 200 (blocks 210-230) as described herein can be implemented with the user-provided permissions, e.g., by accessing data as permitted by the user. If it is determined in block 204 that the permissions provided by the user in block 202 are insufficient, block 204 is followed by block 206, else block 204 is followed by block 210.

In block 206, user permission is requested to access user data. For example, if the user has denied permission for one or more portions of user data that may be used in blocks 210-224, a user interface may be provided for the user to provide permission for such portions of the user data. The user interface may indicate to the user how the data may be used and/or provide an indication that providing such permissions may benefit the user, e.g., by enabling provision of image-based creations. Alternatively, e.g., if the user dismisses the request for access to user data or otherwise indicates their denial of permission, the method ends at block 206, such that no user data is accessed. In such a case, blocks 210-234 are not performed.

If the permission provided by the user is sufficient, block 204 is followed by block 210. The remainder of the method, e.g., blocks 210-234 are performed with selective access to user data as permitted by the user. In some implementations, the user may be provided additional prompts to provide access to user data or to modify permissions.

In block 210, a playback mode is entered on a device, the playback mode playing one or more image compilations in a playback session of the playback mode. In some implementations, the playback mode is provided by an image application running on a device (e.g., client device or server device). The playback mode can be entered automatically by the device (without user input) or in response to user input such as a user command. For example, each graphical element (e.g., a thumbnail image) displayed in a user interface of an image application can represent an associated image compilation, and the image compilation is played in the playback mode if the associated graphical element is selected by user input (e.g., via a touchscreen, mouse input, etc.).

In playback mode, one or more image compilations are displayed on a display by the device. For example, an image compilation can include multiple images (any of which can be still images, videos, animations, etc.), and these images are displayed in a sequence on the device display during playback, e.g., similar to a slideshow. The images can be displayed for a particular time duration that is the same for all images, or can vary duration for different images. The time duration can be determined by the device (e.g., image application) or may be configurable by a user. In some implementations, multiple image compilations are displayed in succession in playback mode. For example, the user can select multiple image compilations to play, or successive image compilations can be automatically selected by the device to play, e.g., after a user-selected image compilation. One or more of the image compilations may have been generated by the device or other system automatically, or may have been generated by a user. Some examples of image compilations are described above. Block 210 may be followed by block 212.

In block 212, message criteria are obtained for one or more device messages from storage accessible to the device. Message criteria can include various criteria used to select and/or play one or more device messages during playback of image compilation(s). For example, the message criteria can include trigger conditions that can be used to determine whether to select and play a device message associated with the trigger criteria. In some implementations, message criteria for multiple device messages can be obtained and examined to determine which device message to select for display. In some implementations, the message criteria can be obtained in response to detecting that the playback mode is entered in block 210. In some implementations, the message criteria can be obtained at other times, e.g., prior to playback mode being entered. Block 212 may be followed by block 214.

In block 214, one or more device messages are selected, based on the message criteria (and/or other criteria), for display during the playback of the image compilation(s). In some implementations, a device message is selected by the device (e.g., image application) from multiple device messages stored in storage accessible to the device. The message criteria of the device messages are evaluated to determine whether the device messages are eligible for display; if eligible, a device message is selected for display.

In some implementations, message criteria can be evaluated for each of multiple device messages in parallel, or sequentially in a particular order, e.g., based on a ranking or priority of the device messages (which can be indicated in associated message criteria), a given list order, random order, etc. In some implementations, message criteria for a particular device message can be obtained at a time of evaluation of the device message.

In some implementations, the message criteria can include trigger conditions that indicate when the associated device message is eligible for display. Trigger conditions indicate a particular condition that is required to be met by the image compilation(s) playing in the current session to cause the associated device message to be eligible for display. The trigger conditions can include, for example, time-based conditions, content-based conditions, and user-based conditions.

In some examples, time-based conditions can include a minimum or threshold duration of the image compilation to make the associated device message eligible for display in (or after) that image compilation. For example, if a threshold duration is one minute, and the playing image compilation has a duration of 30 seconds, then the device message associated with the threshold duration is not eligible for display. Other time-based conditions can include that the current time of playback be within a particular time period, e.g., a particular time range, day, week, or other time period. For example, the device message can be eligible for display in particular time periods such as a particular day of the week or month, a particular month or year, a particular holiday, etc. In further examples, a time-based condition can require that the timestamps (time of capture) associated with one or more images (or all images) of the playing image compilation are within a particular time period. For example, a device message (e.g., indicating to share messages, etc.) can be eligible for display if all the images of the image compilation were captured one year ago (e.g., captured within a particular time range of a day that occurred one year prior to the present day).

In some examples, content-based trigger conditions can include a particular type of image feature be visually depicted in the playing image compilation (e.g., visually depicted by pixels of one or more images in the image compilation) to make the associated device message eligible for display. In some examples, types of image feature can include persons' faces, animals, landscape features (e.g., trees, mountains, grass, bridges, roads, clouds, sky, etc.), objects of certain types (e.g., vehicles, buildings, furniture, food, etc.), etc. For example, if a content-based condition is faces, and the playing image compilation has one or more faces, then the associated device message is eligible for display.

Further examples of content-based trigger conditions can require particular users or persons to be visually depicted in the playing image compilation to make the associated device message eligible for display, if permission from the user has been obtained. In some implementations, the device can scan the content of the playing image compilation to determine if such users appear, e.g., via tags, image recognition features (if permission has been obtained from the user), etc. For example, if user permission has been obtained, the users can be particular users or people that are present in the user's contact list or the user's known facial groups list (e.g., stored on the device) that are required to appear at some point in the playing image compilation for the device message to be eligible for display. In still further examples, the content-based trigger condition can include that one or more image features (persons or other objects) are currently not tagged, labelled, or otherwise unrecognized or uncategorized.

In some examples, device state-based trigger conditions can be used if permission has been obtained from the user of the device, which can be based on particular device states or device settings, e.g., that the user has selected. In some examples, the trigger condition can include a threshold amount (or less) of image storage being available, a particular state of a device setting that enables automatic backup of images by the device to server storage, a particular state of a device setting to display a user-selectable control in a particular user interface of the device to play image compilations, a particular state of a device setting of a camera of the device (e.g., a setting to store time or location of capture with photos taken, exposure or focus settings, etc.), etc. In an example, if the device's image storage space is below a threshold, indicating that the user is running out of image storage space on the device, an associated device state-based trigger condition is met. Similarly, if the device's auto-backup of user images is not enabled, or if a particular camera setting is outside a threshold range, an associated device state-based trigger condition can be met.

In some implementations, particular trigger conditions can be associated with device messages that provide or indicate particular associated device functions. For example, a device message can provide an option for the device to open an editor interface to edit, or can directly modify, a particular type of image feature, and that type of image feature can be included in a content-based trigger condition for that device message. In some examples, a device message related to modifying face images (e.g., increasing skin blur, adding comedic overlays to persons' faces, etc.) can have a content-based trigger condition of faces as the content type, such that faces are required to appear in the playing image compilation for the device message to be eligible for display. In another example, a device message related to obtaining user input to label image features can have a content-based condition of detecting image features in a playing image compilation that do not have labels or tags (and/or have labels assigned by the device with lower than a threshold confidence level, indicating reduced accuracy of image recognition). Similarly, a content-based condition that the playing image compilation does not have a title or has a title that has lower than a threshold recognition confidence level can be associated with a device message that obtains user input to provide that title. In another example, a device message related to sharing one or more images from the image compilation to other users (if user permission has been obtained), can have a content-based condition of particular users or people that are in the user's contact list or the user's known facial groups list (e.g., stored on the device) being required to appear in the playing image compilation for the device message to be eligible for display. In another example, a device message related to providing an option for the user to acquire additional image storage can have a device state-base condition of the user's available storage space for images being below a particular threshold.

In some implementations, trigger conditions can include other conditions that are based on one or more other characteristics (including visual characteristics or other characteristics) of one or more images being displayed in a playing image compilation, which can be different from those conditions described above. For example, trigger conditions can require that a particular visual style of image be present in the image compilation, such as black and white or sepia-toned images, that the images have a particular pixel resolution (or range of resolutions), that the images have below a threshold noise level, etc.

In some implementations, the message criteria can also include a cooldown period, such that if the current time (or time at which the image compilation ends playing) is still within the cooldown period (e.g., a cooldown timer is still in effect), the associated device message is ineligible for display. In some implementations, the cooldown period can prevent excessive repetition of the same device messages for the user. For example, if the current time is within a cooldown period of two days for a device message, the device message is ineligible for display. The cooldown period prevents the device message from repeating within that two day period.

Other or additional message criteria can also be provided in some implementations. For example, each device message can be assigned a ranking or priority value indicating its ranking or priority to be displayed relative to the other device messages available for display. Such rankings or priority values can be determined based on a variety of factors, e.g., current popularity or frequency of use among the user of this device and/or a particular set of multiple users, having an association with device functions that the user often uses, etc. In some implementations, rankings or priorities can be adjusted based on events relating to the device message, e.g., the device message being previously displayed, the user skipping the device message, etc. can lower rankings or priority values.

In some implementations, other display criteria can also be used in the selection of device messages, such that the display criteria must be met for a device message to be eligible for display. For example, display criteria can be associated with the device or playback mode rather than each individual device message, and can make any device message ineligible for display regardless of its individual message criteria. For example, the device or image application can have a display condition that a maximum threshold number of (any type of) device messages can be displayed per specified period of time. In an example condition, a device message cannot be displayed within a threshold time since a previous display of a device message on the device. In an example, the criteria specify that two device messages are to be displayed per day, such that if two device messages have previously been displayed in playback sessions during the current day, then all further device messages are currently ineligible for display until the following day. In some implementations, if a device message was scheduled for display at the initiation of the current playback mode, such scheduling can be cancelled if the display condition is no longer met and that device message is made ineligible for display.

In another example, display criteria can include a condition that no device message can be scheduled for display in the first image compilation that is played during the current playback session initiated in block 210, and that device messages can be scheduled in second and later image compilations that are played in the current playback session. In another example, display criteria can require that require a minimum threshold number of images of the video composition be displayed before a device message is displayed. In another example, a display condition can require diversity of device messages; for example, a device message cannot be displayed again until after a minimum threshold number of other device messages (or other types of device messages) are displayed within a playback session and/or over all playback sessions. In some implementations, different types of device messages can include, for example, messages that are associated with different device functions such as image color editing, ordering physical prints of images, sharing of images to other users, storing images in a particular storage location, etc.

In some implementations, data that is included in a device message can be downloaded to a client device (e.g., any of client devices 120-126) ahead of time, when a triggering condition is detected to be imminent (e.g., within a threshold time period before the triggering condition). For example, if a particular holiday is a trigger condition for a device message, the device message may be generated and/or downloaded in advance and cached on the client device. Such downloading can ensure that the device message is available (or can be generated by the client device) at the time the triggering condition is detected.

After evaluating the trigger conditions and other message criteria as described above, the device selects one or more device messages for display. Block 214 may be followed by block 216.

In block 216, a schedule is determined for the display of the device message(s) selected in block 214. In some implementations, the schedule can specify a time of display and a time duration for the device message to be displayed. In some implementations, the device message is scheduled to be played in a particular ordered position within an image compilation relative to the images of the image compilation. For example, the device message can be scheduled to be displayed at the end of the image compilation, e.g., after the last image of the image compilation and before any image of a successive image compilation is displayed. In some examples, the device message can be scheduled at other ordered positions, e.g., after an image of the video composition that is closest to the midpoint of the duration of the image compilation, at the beginning of the image compilation, between two image compilations that are to be successively played, etc.

In some implementations, the schedule can be based on message criteria associated with the device message and/or display criteria described above. In some cases, a device message is found to be ineligible for display during scheduling. For example, display criteria may require a minimum number of images of the video composition be displayed before a device message can be displayed, such that it must be determined if a display time is available in the image compilation for the device message to be scheduled.

In some implementations, the device message can be scheduled at a time or position in the image compilation that can vary, e.g., based on the subject of the device message, based on the image compilation being played, and/or based on other factors. For example, the device message can be scheduled near a midpoint of the image compilation if the image compilation has a duration greater than a threshold duration. In another example, the device message can be scheduled to be displayed after a particular image of the image compilation that is associated with (e.g., particularly relevant to) a device function that is indicated or provided by the device message. For example, if an image compilation of 10 images has only 1 image showing a person's face, and the device message includes an option to enhance faces, then the device message can be scheduled to be displayed after the one image showing the face. Block 216 may be followed by block 218.

In block 218, one or more images are identified in the user's image library to be displayed in or accompanying display of the device message. In various implementations, the images are associated with the playing image compilation and/or are associated with a device function indicated by the device message. In some examples, the identified images can be included in at least one of the image compilations playing or to be played in this session; and/or can depict one or more image features having a same type as one or more image features depicted in at least one image in the playing image compilations (e.g., types of image features can be as described above); and/or have one or more characteristics modifiable by the device function indicated by the selected device message.

In some implementations, the identified images are associated with (e.g., relevant to) a text message in the device message and/or a device function indicated or provided by the device message. For example, if the device message provides an option to obtain printed photos of images in the image compilation, then an image from the image compilation (which is in the user's mage library) can be identified for display in the device message as an example of a photo that can be printed. In another example, if the device message provides an option to enhance faces in images, an image of a face from the video composition, or an image from the user's library that does not appear in the video composition, can be identified for display in the device message since it has a characteristic (e.g., image feature) modifiable by the device function. In some implementations, an image can be identified in block 218 that is not included in any playing video composition nor is included in the user's image library, e.g., an image from a public source (e.g., web page, online service, etc.).

In some implementations, one device message can be selected in block 214, scheduled in block 216, and have images identified in block 218, then another device message can be selected, scheduled, and have images identified, and so on until a threshold number of device messages are selected and scheduled for display in the current playback session.

In some implementations, multiple device messages can be scheduled as in block 216 and/or have images identified as in block 218 in advance of display of these messages, e.g., performed at or just after the initiation of the current playback session in block 210. The order of display of these device messages can also be determined prior to display of any device messages during the current playback session. In some implementations, one or more device messages can be scheduled as in block 216 and/or identified as in block 218 at a time prior to the initiation of the current playback session in block 210. For example, such device messages can be assigned to particular image compilations before user selection of those image compilations for playback. Block 218 may be followed by block 220.

In block 220, a selected device message is caused to be displayed by the device based on the schedule, e.g., at a scheduled time during the playback of a video composition. In various implementations, the device message can be displayed as if it is another image in the video composition, e.g., having a duration. For example, a progress bar can be displayed to indicate a current playback point in the image compilation in some implementations, and the duration of the device message can occupy a portion of the progress bar. The device message can be displayed in played after an image compilation image, e.g., in place of the current image compilation image, or covering a portion the image compilation, covering a blurred out version of the current compilation image, etc.

In some implementations, the displayed device message can include a text message, one or more images as identified in block 218, a message option, and/or a skip option. In some implementations, the text message can provide a description of a device function that is provided by the device message via a message option. The image(s) can be identified in block 218.

The message option can be graphical element that is selectable via user input to the device and, when selected, causes an associated device function to be performed by the device. In some implementations, the device function is associated with one or more images of the playing image compilations, and/or one or more images of the user's library. For example, the message option can be a graphical button, text link, or other element displayed on a touchscreen and selectable via touch input; or can be an element selectable via other input device (mouse, keyboard, trackpad, etc.). The message option can include text that indicates the associated device function. In some examples, the message option, when selected, can cause a device function to be performed, as described below, e.g., initiation or execution of an application program, application interface, and/or application operation or function that is referred to by the displayed device message, display of images for selection by the user and/or a modification of selected images, storing of images in a particular storage location, etc.

The skip option can be a graphical element that is selectable via user input to the device and, when selected, causes the device message to be removed from the screen and playback of an image compilation to be resumed. The method may continue to block 222.

In block 222, it is determined whether the user selects the message option in the displayed device message. For example, the message option can be selected by user input via a touchscreen or other input device. If the message option is not selected, the method continues to block 226, described below.

If the message option has been selected, the method continues to block 224, in which a device function associated with the device message is initiated. The device function can be associated with images, and in some implementations, is associated with one or more images of the playing image compilations and/or one or more images of the user's library. As described above, the device function can be any of a variety of functions performed by the device. In some examples, the device function can be to initiate execution of an application program (and/or application interface) that is referred to by the device message, e.g., an image editing interface or program, an item selection and ordering program, a messaging interface of a messaging program that can send messages to other users, share images to other users, etc.

For example, in some implementations, the device function can be display of images for selection by the user, and an image editing program (or editing interface of an image application) can be then executed and displayed on the device screen, allowing modification of selected images (e.g., color modification, adding blur, reducing noise, etc.). In another example, the device function can be causing a user interface to be displayed for an ordering application that orders items (that are sent to the user) based on user input, e.g., printed photos based on selected images. In another example, the device function can be causing images of the image compilation (or other user images) to be stored in a particular storage location, e.g., to a "favorites" storage folder, to local storage on the device, to remote storage on a remote device (e.g., server system 102 or other client device) accessible by the device over a network, etc.

In another example, the device function can be adding one or more images of the image compilation, or an image that is displayed in the device message, to one or more other image compilations of the user (e.g., the user can be provided with an interface or options to select which image compilations are to receive these images). In another example, the device function can be causing a prompt or input field (e.g., in the device message) to be displayed, which receives user input that confirms an existing label or tag of an image feature in an image of the playing image compilation (e.g., the label or tag was recognized with low accuracy by a system); or the user input provides text to be used as the label or tag. The image feature can also be displayed in the device message. Similarly, such a prompt or input field can receive user input to confirm or provide a title for the playing image compilation. In another example, the device function can be providing a selectable user interface element in a particular user interface (e.g., a home screen of the device) that is associated with the user's image compilation(s) and, when selected by the user, causes the image compilations to play in the playback mode on the device. In another example, the device function can be changing a device setting, e.g., enabling an automatic storage backup feature for image compilations and/or library images, changing a setting of a camera on the device, etc.

In some implementations, additional options can be displayed in the device message in response to selection of the message option as determined in block 222. For example, selected of the displayed message option can cause a menu of user-selectable options to be displayed. In some examples, the options are, or are similar to, menu options of a user interface of an application that is indicated by the device message and/or message option. In some implementations, multiple hierarchies of options can be displayed. In some examples, selection of the message option can cause three options to be displayed under the message option, e.g., editing operations from an image editing interface such as different filters (e.g., "black and white", "vivid", and "luminous") that, when selected, change the photos of the playing image compilation(s) in the current playback mode. In further examples, if the device function is to request user input that provides names of image features or a title for the image compilation, the additional options can be suggestions for those names and/or title as determined by the device, e.g., based on image detection and/or recognition techniques applied to the images of the image compilation.

In some implementations, the device message is removed from the screen upon initiation of the device function. In some implementations, upon initiation of the device function, playback of the image compilations is paused in the playback mode, and, after the device function is performed, the normal playback mode is continued, e.g., to display the playback interface and display a next image of the image compilation, display a next image compilation if another image compilation is to be played, or exit from the playback mode if no further image compilations (and device messages) are to be played. In some implementations, a cooldown period is added to the message criteria for the device message, so that the device message is not eligible to be displayed again until after the cooldown period has expired. The method may continue to block 232.

If the user does not select a message option as determined in block 222, it is determined in block 226 whether the user selects a skip option of the device message. For example, the skip option can be selected by user input via a touchscreen or other input device. If the skip option is not selected, the method continues to block 230, described below.

If the skip option has been selected, the method continues to block 228, in which the device message is removed from the display screen. In some implementations, normal playback mode is continued, e.g., to display a next image of the image compilation, start a next image compilation (if at the end of the playing image compilation and another image compilation is to be played), or exit the playback mode (if at the end of the playing image compilation and no further image compilations are to be played). In some implementations, a cooldown period is added to the message criteria of the skipped device message similarly as described above. The method may continue to block 232.

If the user does not select a skip option as determined in block 226, then in block 230, the method displays the device message until the duration of the device message expires (or other user input alters the display of the device message, e.g., exit of the playback mode). In some implementations, a cooldown period is added to the message criteria of the device message similarly as described above. The method may continue to block 232.

In some implementations, after the skip option has been selected by the user for the device message (block 228), or the device message is displayed for its full duration without receiving user input (block 230), the message criteria for the device message can be adjusted to cause future selection and display of the device message to be reduced in frequency or removed from eligibility for display. For example, the device message can be assigned a lower ranking or priority value, and/or can be assigned a larger cooldown period that is greater than a standard cooldown period. In some implementations, each time that the device message is skipped, the cooldown period is increased in duration, so that the cooldown period may continually increase over time. In some examples, the increase in cooldown period can be linear, exponential, or based on another function or format.

In some implementations, the playback of the image compilation(s) can be paused in response to the user selecting a message control option or a menu option resulting from selection of a message control option.

In block 232, it is determined whether there is another device message that is scheduled for display, e.g., as determined in block 216. If there are no more device messages for display, then the method continues to block 234 to continue playback of the video compositions similarly as described for blocks 224, 228, and 230. If there are one or more device messages scheduled for display, the method continues to block 220 to cause display of the next scheduled device message (if the conditions in the message criteria and display criteria continued to be met).

In various implementations, various blocks of method 200 may be combined, split into multiple blocks, performed in parallel, or performed asynchronously. In some implementations, one or more blocks of method 200 may not be performed or may be performed in a different order than shown in FIG. 2. For example, in some implementations, blocks 212-218 can be performed prior to block 210. In various implementations, block 218 may be performed before block 214 or 216, or performed prior to method 200 being initiated. In some implementations, blocks 214-216 or 214-218 may be performed multiple times, e.g., for each device message to be displayed. Method 200, or portions thereof, may be repeated any number of times using additional inputs. For example, in some implementations, method 200 may be performed when one or more new image compilations are added to the user's image library.

Figures 3A, 3B:
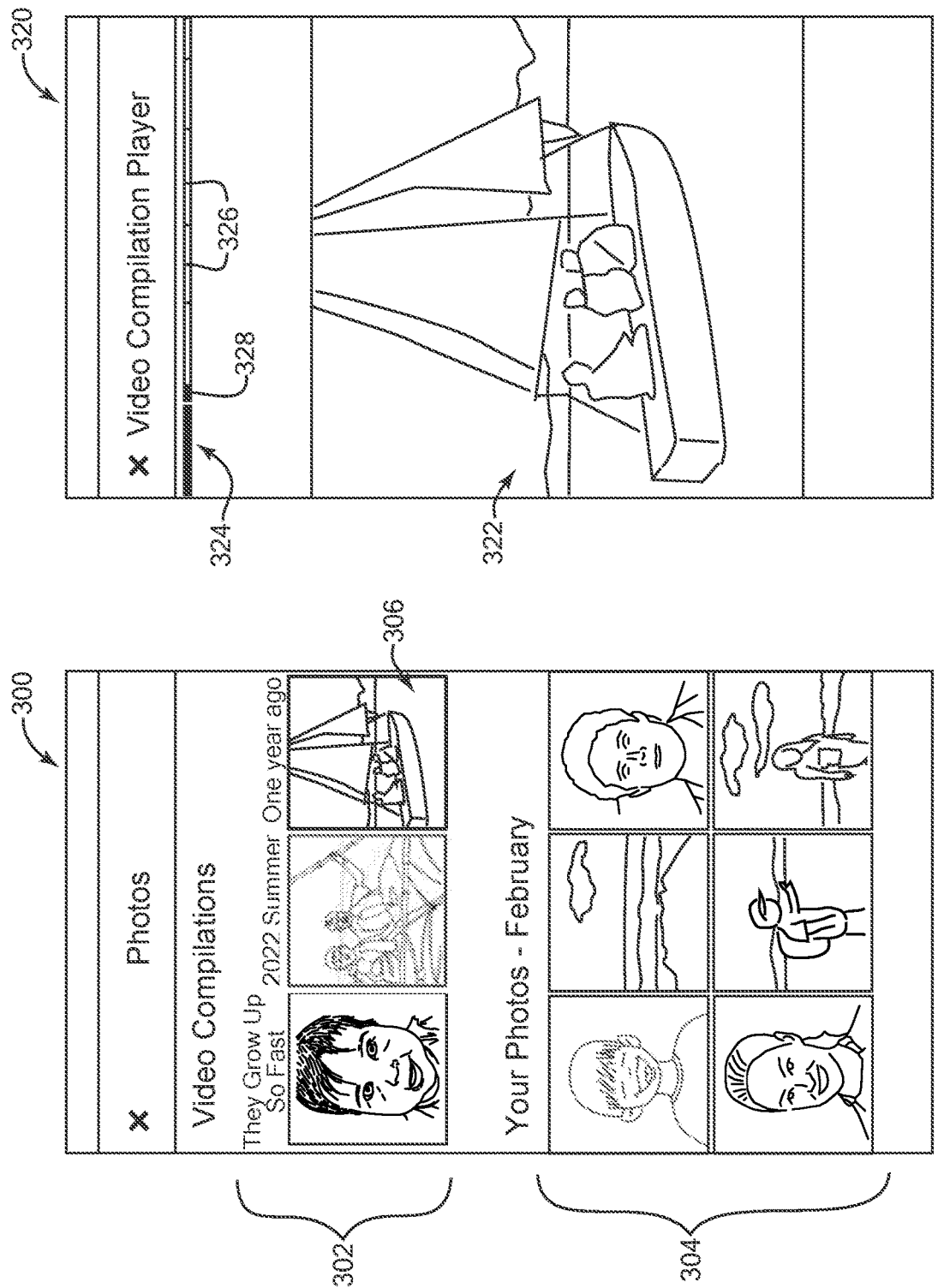
FIG. 3A illustrates an example user interface of an image application, according to some implementations.
FIGS. 3B-3C illustrate an example user interface for a playback mode in which an image compilation is displayed, according to some implementations.

FIG. 3A illustrates an example user interface 300 of an image application, according to some implementations described herein. User interface 300 can be displayed on a client device, e.g., any of client devices 120-126. In some implementations, user interface 300 can include actionable image compilation elements 302 and an image grid 304.

Image grid 304 may include a plurality of images representing images of a user's image library. For example, the images in grid 304 can be thumbnail representations of the user's images. In various implementations, the grid can include any number of images per row, and may be scrollable. In some implementations, images in the image grid 304 can be arranged in a particular order, e.g., chronological order based on time of capture, reverse chronological order, or other order.

Actionable image compilation elements 302 may be associated with corresponding image compilations. In some implementations, each image compilation is a collection of images (e.g., still images, videos, etc.) as described above. When compilation elements 302 are generated, corresponding titles for the elements can also be generated and can include words or phrases associated with image features, theme, subject of the image compilation, etc. The image compilations include particular images from the user's library that can be selected based on various factors as described above. Particular images from which compilation elements 302 are derived can be referred to as cover images for the image compilations.

Compilation elements 302 are each selectable by a user input, e.g., via a user tapping on a touchscreen, providing a mouse click, or providing other type of input. In response to selection of a compilation element 302 (e.g., element 306), a corresponding image compilation may be displayed to the user, as illustrated in FIG. 3B.

FIG. 3B illustrates an example user interface 320 for a playback mode in which an image compilation is displayed. In this example, actionable compilation element 306 was selected by the user in interface 300 of FIG. 3A, resulting in playback user interface 320 being displayed by the device. In this example, the playing image compilation includes a number of images sequentially displayed in a slideshow. Image 322 is currently being displayed, which has replaced a previous image in the image compilation that was previous displayed, and which will be replaced by the next image in the image compilation (as shown in FIG. 3C).

In this example, a progress bar 324 is displayed in the interface 320 to indicate the progress of the playback of the image compilation. In some implementations, each image of the image compilation can be indicated on the progress bar as different marked section 326 separated by indicated divisions, such that when a moving bar 328 crosses a division, the next image of the image compilation is displayed. The length of each section can indicate the time duration of display of the associated image. In some implementations, the images can be displayed for different durations.

Figure 3D:
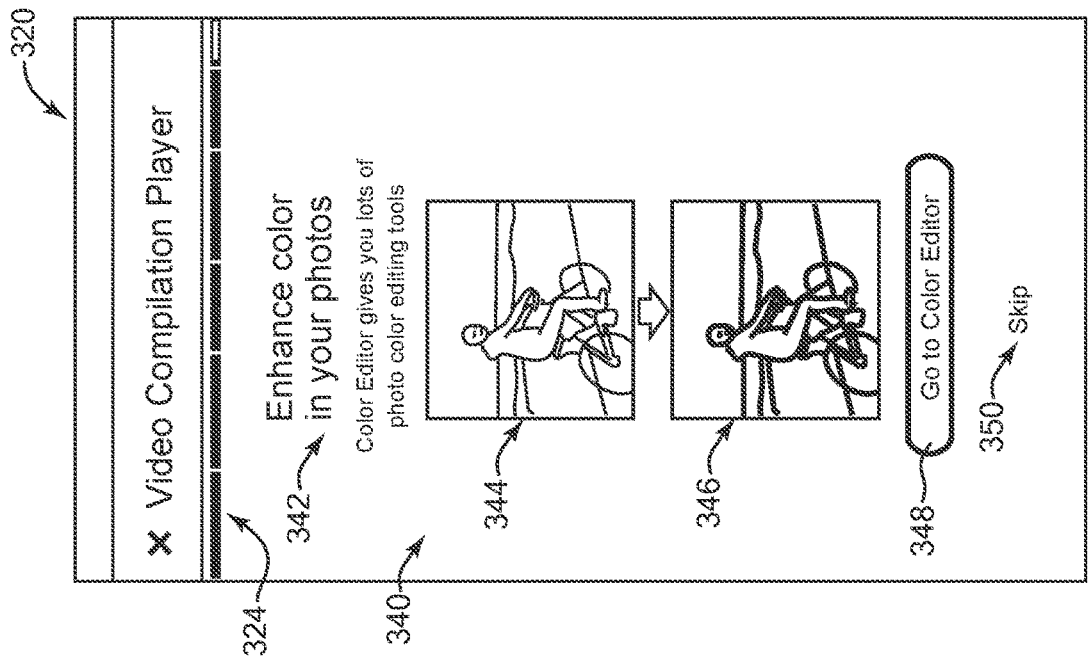
FIGS. 3D-3F illustrate the user interface of FIGS. 3B-3C at a point in playback of an image compilation when device messages are displayed, according to some implementations described herein.
Figure 3C:
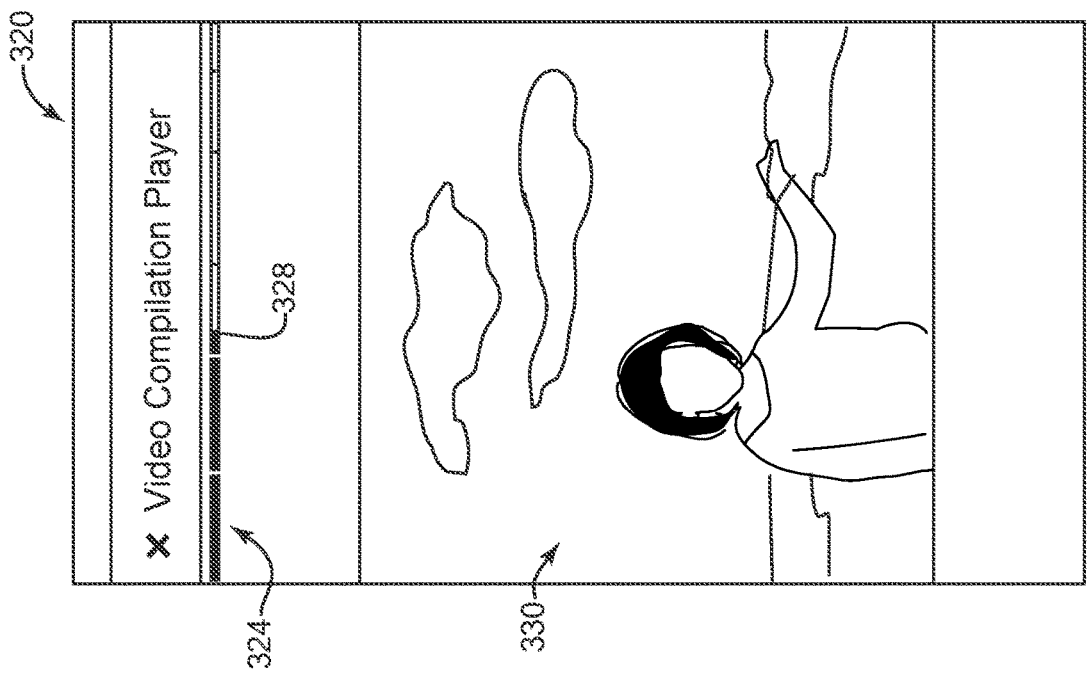

FIG. 3C illustrates the user interface 320 of FIG. 3B at a later point in the playback of the image compilation when the next image 330 in the image compilation is displayed. Progress bar 324 indicates that a different image is being displayed based on the location of the edge of the bar 328.

FIG. 3D illustrates the user interface 320 of FIGS. 3B and 3C at a point in the playback of the image compilation when a device message 340 is displayed. Progress bar 324 shows that the device message 340 is the last image to be displayed in the playing image compilation. In this example, device message 340 includes a text portion 342, a user-library image 344, a message option 346, and a skip option 348.

Text portion 342 provides a message to the user, which in this example includes a description of a device function associated with the device message. The device function in this example is an editing function of an image editing application (or editing mode of an image application that provides the playback of image compilations), which can modify the color of an image. Image 344 is an image selected from the user's library accessible by the client device running interface 320. In this example, image 344 is an image selected for its association with the device function, e.g., it is suitable for color enhancement because of its color characteristics, e.g., it is detected to have colors of low saturation. In this example, image 344 has been processed by the image editor to provide a resulting image 346 that shows an example enhancement. In this example, image 344 is not included in the image compilation currently playing in interface 320; in other implementations or examples, an image from the image compilation can be displayed as images 344 and 346 in original and enhanced forms.

Message option 348 is a selectable displayed button that, when selected by user input such as a tap on the button via a touchscreen, causes an editor user interface to be displayed (not shown) with image 344. For example, the user can enhance the color of image 344 using the editor interface, and/or perform other types of modifications to the image 344 as allowed by functions of the editor interface. In some other examples, message option 348 can be a control that applies a modification directly to image 344 in the user's library as shown in device message 340. In another example, message option 348 can provide an option to apply modifications similar to the displayed example enhancement to all of the images in the playing image compilation. In other examples, message option 348 can be a control that opens a selection interface that allows a user to select images to which the example enhancement is to be applied and that allows the user to confirm to apply the enhancement to the selected images.

Skip option 350 is a selectable control that, when selected by user input, causes the device message 340 to be removed from the screen. Since device message 340 is the last image of the currently-playing image compilation, and there are no other image compilations queued to play next, the skip option 350 causes the playback to end and the device returns to displaying interface 300 of FIG. 3A.

Figure 3F:
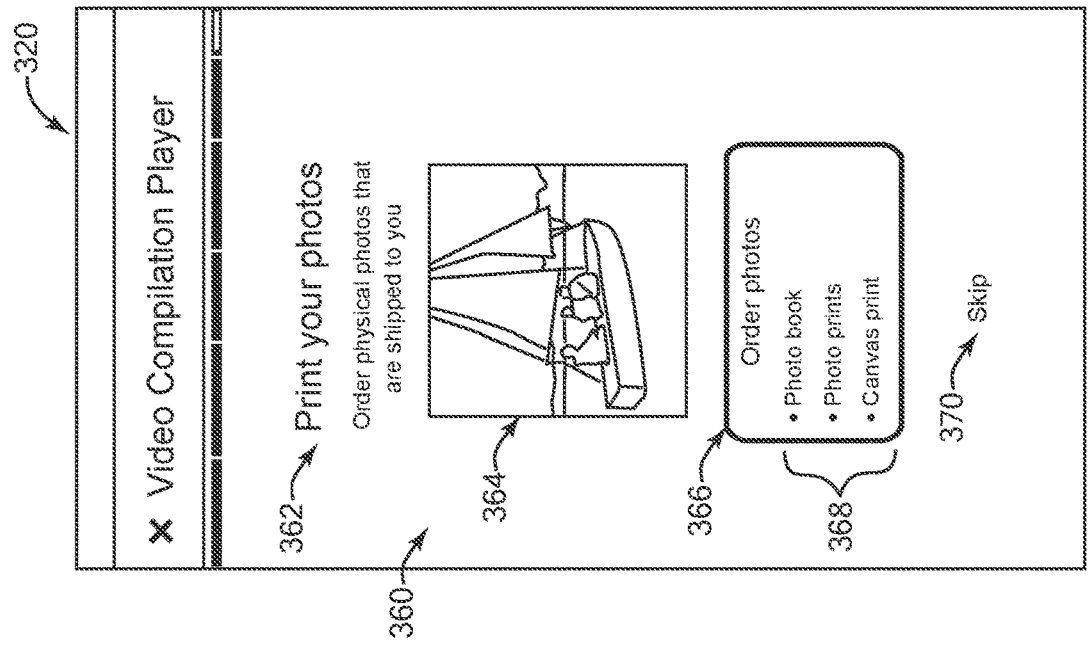
Figure 3E:
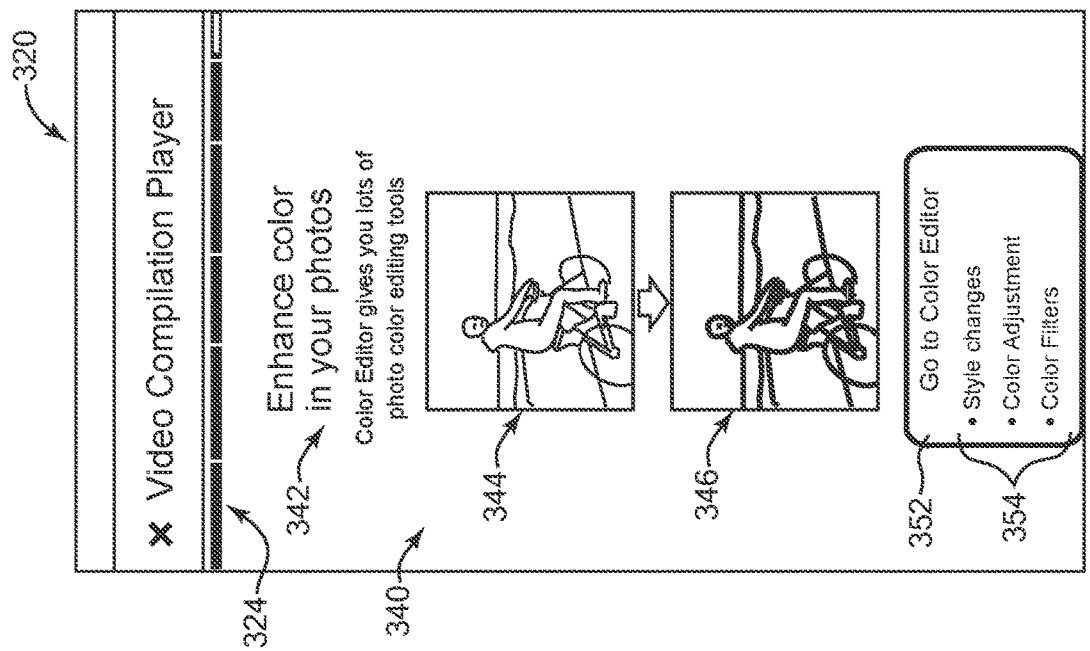

FIG. 3E illustrates interface 320 and device message 340 of FIG. 3D with an alternative type of message option 352. In this example, selection of message option 352 by user input causes a menu of options 354 to be displayed under the title of message option 352. Options 354 can be, for example, editing options of the image editing interface referred to by device message 340. The user can select a particular option 354 to cause the editor interface to open with the selected editing option applied to image 344 (or to another image, e.g., an image of the image compilation). In other examples, selection of a particular option 354 can apply the option to, for example, one or more images of the image compilation.

FIG. 3F illustrates interface 320 displaying another example of a device message 360. In this example, device message 360 includes a text portion 362, an image 364, a message option 366, and a skip option 370 similar to device message 340, except that device message 360 provides a device function of ordering printed photos of one or more images. For example, image 364 can be an image from the image compilation that is playing in interface 320, to indicate that the user can order printed photos of images recently displayed. In this example, options 368 are displayed if the user selects the message option 366, allowing different options for ordering printed photos. If the user selects an option 368, an ordering interface can be displayed on the display screen of the device to enable the user to complete the order.

Figure 4:
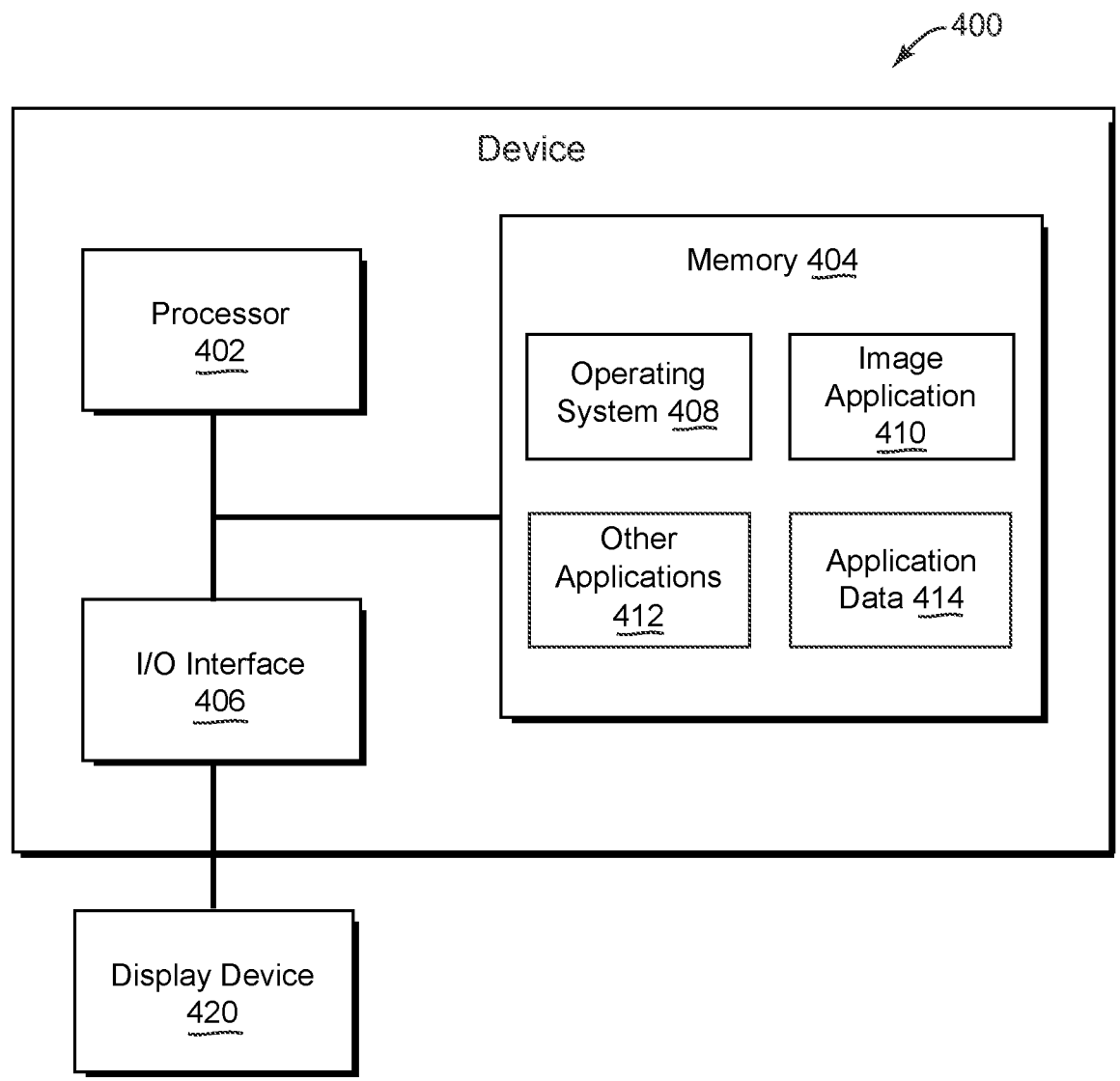
FIG. 4 is a block diagram of an example computing device which may be used to implement one or more features described herein.

FIG. 4 is a block diagram of an example device 400 which may be used to implement one or more features described herein. In one example, device 400 may be used to implement a client device, e.g., any of client devices 120-126 shown in FIG. 1. Alternatively, device 400 can implement a server device, e.g., server device 104. In some implementations, device 400 may be used to implement a client device, a server device, or both client and server devices. Device 400 can be any suitable computer system, server, or other electronic or hardware device as described above.

One or more methods described herein can operate in several environments and platforms, e.g., as a standalone computer program that can be executed on any type of computing device, as a web application having web pages, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 400 includes a processor 402, a memory 404, and input/output (I/O) interface 406. Processor 402 can be one or more processors and/or processing circuits to execute program code and control basic operations of the device 400. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some implementations, processor 402 may include one or more co-processors that implement neural-network processing. In some implementations, processor 402 may be a processor that processes data to produce probabilistic output, e.g., the output produced by processor 402 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 404 is typically provided in device 400 for access by the processor 402, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 402 and/or integrated therewith. Memory 404 can store software operating on the server device 400 by the processor 402, including an operating system 408, image application 410 (e.g., which may be the same as image application 106 of FIG. 1), other applications 412, and application data 414. Other applications 412 may include applications such as a data display engine, web hosting engine, map applications, image display engine, notification engine, social networking engine, media display applications, communication applications, web hosting engines or applications, media sharing applications, etc. In some implementations, the image application 410 can include instructions that enable processor 402 to perform functions described herein, e.g., some or all of the method of FIG. 2. In some implementations, the user's library of images and/or data for image compilations and device messages can be stored as application data 414 or other data in memory 404, and/or on other storage devices of one or more other devices in communication with device 400.

Any of software in memory 404 can alternatively be stored on any other suitable storage location or computer-readable medium. In addition, memory 404 (and/or other connected storage device(s)) can store one or more messages, one or more taxonomies, electronic encyclopedia, dictionaries, digital maps, thesauruses, knowledge bases, message data, grammars, user preferences, and/or other instructions and data used in the features described herein. Memory 404 and any other type of storage (magnetic disk, optical disk, magnetic tape, or other tangible media) can be considered "storage" or "storage devices."

I/O interface 406 can provide functions to enable interfacing the server device 400 with other systems and devices. Interfaced devices can be included as part of the device 400 or can be separate and communicate with the device 400. For example, network communication devices, storage devices (e.g., memory and/or database), and input/output devices can communicate via I/O interface 406. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 406 can include one or more display devices 420 that can be used to display content, e.g., images, video, and/or a user interface of an application as described herein. Display device 420 can be connected to device 400 via local connections (e.g., display bus) and/or via networked connections and can be any suitable display device. Display device 420 can include any suitable display device such as an LCD, LED, or plasma display screen, CRT, television, monitor, touchscreen, 3-D display screen, or other visual display device. Display device 420 may also act as an input device, e.g., a touchscreen input device. For example, display device 420 can be a flat display screen provided on a mobile device, multiple display screens provided in glasses or a headset device, or a monitor screen for a computer device.

The I/O interface 406 can interface to other input and output devices. Some examples include one or more cameras which can capture images and/or detect gestures. Some implementations can provide a microphone for capturing sound (e.g., as a part of captured images, voice commands, etc.), a radar or other sensors for detecting gestures, audio speaker devices for outputting sound, or other input and output devices.

For ease of illustration, FIG. 4 shows one block for each of processor 402, memory 404, I/O interface 406, and software blocks 408-414. These blocks may represent one or more processors or processing circuitries, operating systems, memories, I/O interfaces, applications, and/or software modules. In other implementations, device 400 may not have all of the components shown and/or may have other elements including other types of elements instead of, or in addition to, those shown herein. While some components are described as performing blocks and operations as described in some implementations herein, any suitable component or combination of components of environment 100, device 400, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer-readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method comprising:
   determining that a playback mode is entered on a device, the playback mode to display one or more image compilations on a display of the device, wherein each image compilation includes images to be successively displayed on the display of the device;
   obtaining message criteria for one or more device messages, each of the one or more device messages indicating a respective device function associated with respective one or more images of the one or more image compilations or of a user image library;
   in response to determining that the playback mode is entered, selecting the device message from a plurality of device messages, wherein selecting the device message is based on the message criteria associated with the device message;

identifying an image in the user image library associated with a user, the image to be included in the selected device message, wherein the image:
  is included in at least one of the one or more image compilations,
  depicts one or more image features having a same type as one or more image features depicted in at least one image included in the one or more image compilations, and/or
  has one or more characteristics modifiable by the device function indicated by the selected device message;

causing the selected device message to be displayed on the display of the device, wherein the displayed device message includes a message control option that is user-selectable and the identified image; and in response to receiving user input that selects the message control option, initiating the device function indicated by the displayed device message.

2. The computer-implemented method of claim 1, wherein the message criteria for each device message includes one or more trigger conditions for the device message, and wherein selecting the device message includes determining whether the one or more trigger conditions have been met, wherein the one or more trigger conditions include one or more of the group of: a time-based condition, a content-based condition, and combinations thereof.

3. The computer-implemented method of claim 2, wherein:
  the time-based condition includes at least one of the group of: a minimum duration of the image compilations, the image compilations are played within a particular time period, and combinations thereof; and
  the content-based condition includes a particular type of image feature visually depicted in the image compilations, wherein the particular type of image feature includes at least one of the group of: person's faces, animals, and landscape features.

4. The computer-implemented method of claim 1, further comprising:
  obtaining display criteria,
  wherein selecting the device message is based on the message criteria and the display criteria, wherein the display criteria include one or more of the group of:
    displaying a maximum threshold number of device messages on the device in each particular period of time;
    displaying a minimum threshold number of images in image compilations prior to displaying each device message;
    displaying a minimum threshold of other device messages before repeating display of a particular device message; and
    combinations thereof.

5. The computer-implemented method of claim 1, wherein the device function of the device message is at least one of the group of:
  enabling a user to order physical prints of the one or more images;
  modifying one or more colors of the one or more images;
  storing the one or more images in particular storage that is in communication with the device;
  sharing the one or more images with one or more other devices;
  adding the one or more images to one or more other image compilations accessible by the device;
  causing display of an input field to receive user input that confirms or provides a label for an image feature in an image of the one or more image compilations;
  causing display of an input field to receive user input that confirms or provides a title for an image compilation of the one or more image compilations;
  and combinations thereof.

6. The computer-implemented method of claim 1, wherein the displayed device message further includes a skip option that is user-selectable, and further comprising:
  in response to receiving user input that selects the skip option, removing the displayed device message from the display and causing playback of the one or more image compilations to continue.

7. The computer-implemented method of claim 6, wherein in response to receiving user input that selects the skip option, modifying the message criteria for the displayed device message to cause future display of the device message to be reduced in frequency.

8. The computer-implemented method of claim 1, wherein the message criteria include a cooldown period that prohibits the displayed device message from being displayed on the display in the playback mode for a time period at least equal to the cooldown period after previously being displayed on the display of the device.

9. The computer-implemented method of claim 1, wherein in response to receiving the user input that selects the message control option, causing a menu of a plurality of options to be displayed, the plurality of options associated with the device function of the displayed device message.

10. The computer-implemented method of claim 1, wherein the displayed device message is associated with a particular time duration, and wherein in response to expiration of the particular time duration, removing the device message from the display and causing playback of the one or more image compilations to continue.

11. A computing device comprising:
  a processor; and
  a memory coupled to the processor, with instructions stored thereon that, when executed by the processor, cause the processor to perform operations comprising:
    determining that a playback mode is entered on a device, the playback mode to display one or more image compilations on a display of the device, wherein each image compilation includes images to be successively displayed on the display of the device;
    obtaining message criteria for one or more device messages, each of the one or more device messages indicating a respective device function associated with respective one or more images of the one or more image compilations or of a user image library;
    in response to determining that the playback mode is entered, selecting a device message from a plurality of device messages, wherein selecting the device message is based on the message criteria associated with the device message;
    determining a schedule associated with the selected device message, the schedule indicating when the device message is to be displayed during playback of a particular one of the one or more image compilations or between playback of two successive image compilations of the one or more image compilations;
    identifying an image in the user image library associated with a user, the image to be included in the selected device message, wherein the image:

is included in at least one of the one or more image compilations, depicts one or more image features having a same type as one or more image features depicted in at least one image included in the one or more image compilations, or has one or more characteristics modifiable by the device function described by the selected device message;

causing the selected device message to be displayed on the display of the device based on the associated schedule, wherein the displayed device message includes:

a message control option that is user-selectable;

the identified image; and a skip option that is user-selectable;

in response to receiving user input that selects the message control option, initiating the device function indicated by the displayed device message; and in response to receiving user input that selects the skip option, removing the displayed device message from the display and causing playback of the one or more image compilations to continue.

* * * * *